US008594378B2

(12) United States Patent
Mori et al.

(10) Patent No.: US 8,594,378 B2
(45) Date of Patent: Nov. 26, 2013

(54) 3D OBJECT DETECTING APPARATUS AND 3D OBJECT DETECTING METHOD

(75) Inventors: Daishi Mori, Fukushima (JP); Kousuke Munakata, Fukushima (JP); Hiroki Oba, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 124 days.

(21) Appl. No.: 13/372,112

(22) Filed: Feb. 13, 2012

(65) Prior Publication Data
US 2012/0219183 A1    Aug. 30, 2012

(30) Foreign Application Priority Data

Feb. 24, 2011    (JP) ................................. 2011-038284

(51) Int. Cl.
*G06K 9/00* (2006.01)
*H04N 5/225* (2006.01)
(52) U.S. Cl.
USPC .......................................... 382/103; 348/169
(58) Field of Classification Search
USPC .......... 382/103, 107, 236; 348/154, 155, 169, 348/170, 171, 172, 352; 340/435, 436
See application file for complete search history.

(56) References Cited

U.S. PATENT DOCUMENTS

| 7,003,136 B1* | 2/2006 | Harville ........................ 382/103 |
| 7,551,067 B2* | 6/2009 | Otsuka et al. ................. 340/436 |
| 2009/0080701 A1 | 3/2009 | Meuter et al. |
| 2009/0080702 A1 | 3/2009 | Ma et al. |

FOREIGN PATENT DOCUMENTS

| JP | 10-222679 | 8/1998 |
| JP | 2007-129560 | 5/2007 |
| JP | 2010-056975 | 3/2010 |

OTHER PUBLICATIONS

European Search Report for corresponding EP Application No. 12 15 6556, dated Jul. 23, 2012, 5 pages.
Corneliu T., et al.: "Real-time pedestrian classification exploiting 2D and 3D information," IET Intelligent Transport Systems, vol. 2, No. 3, Sep. 8, 2008, pp. 201-210.

* cited by examiner

*Primary Examiner* — Abolfazl Tabatabai
(74) *Attorney, Agent, or Firm* — Brinks Gilson & Lione

(57) ABSTRACT

A 3D-object detecting apparatus may include a detection-image creating device configured to detect a 3D object on an image-capture surface from an image captured by an image-capture device and to create a detection image in which a silhouette of only the 3D object is left; a density-map creating device configured to determine the 3D objects spatial densities at corresponding coordinate points in a coordinate plane on the basis of the detection image and mask images obtained for the corresponding coordinate points on the basis of virtual cuboids arranged for the corresponding coordinate points and to create a density map having pixels for the corresponding coordinate points such that the pixels have pixel values corresponding to the determined spatial densities; and a 3D-object position detecting device that detects the position of the 3D object as a representative point in a high-density region in the density map.

16 Claims, 17 Drawing Sheets

M00

DENSITY MAP                HIGH-DENSITY REGIONS

EXTRACT HIGH-DENSITY
REGIONS IN DENSITY MAP
AS 3D OBJECTS

DEPTH MAP

EDGE

EDGE

DEPTH MAP

DETERMINE POSITIONS
OF 3D OBJECTS

1/4 SCALE IMAGE OF DEPTH MAP

DETECTION POSITIONS OF
TWO OTHER VEHICLES

FIG. 10

| TARGET #1 | DETECTION POSITION | x1 (#1)<br>y1 (#1) | x2 (#1)<br>y2 (#1) | x3 (#1)<br>y3 (#1) | ... |
|---|---|---|---|---|---|
| | DETECTION TIME | t1 (#1) | t2 (#1) | t3 (#1) | ... |
| TARGET #2 | DETECTION POSITION | x1 (#2)<br>y1 (#2) | x2 (#2)<br>y2 (#2) | x3 (#2)<br>y3 (#2) | ... |
| | DETECTION TIME | t1 (#2) | t2 (#2) | t3 (#2) | ... |

# 3D OBJECT DETECTING APPARATUS AND 3D OBJECT DETECTING METHOD

RELATED APPLICATIONS

The present application claims priority to Japanese Patent Application Serial Number 2011-038284, filed Feb. 24, 2011, the entirety of which is hereby incorporated by reference.

BACKGROUND OF THE INVENTION

1. Field of the Invention

The present invention relates to three-dimensional (3D) object detecting apparatuses and 3D object detecting methods. In particular, the present invention relates to a 3D object detecting apparatus and a 3D object detecting method which are advantageous to detect a 3D object on an image-capture surface on the basis of an image captured by a single image-capture device.

2. Description of the Related Art

Hitherto, a traffic impediment warning system has been known. In some systems, an impediment on a road surface is detected in an image captured using a monocular (a single) camera mounted on a vehicle and the system issues a warning with respect to the detected impediment.

Various 3D-object detecting methods have been applied to such a traffic impediment warning system. One known example is a method disclosed in Japanese Unexamined Patent Application Publication No. 10-222679. In the method (which is the so-called "background differencing method"), an amount of movement of a vehicle is determined and a past image and a current image captured by a monocular camera are compared with each other to eliminate unnecessary regions, such as a road surface and a distant view, and to extract only 3D objects (movable bodies) on the road surface.

In such a 3D-object detecting method, typically, in order to estimate the position of a 3D object on the basis of an image captured by a camera, a position at which the ground side (i.e., the ground contact point) of the 3D object is shown in the captured image is detected.

Thus, in the 3D-object detecting methods of the related art, for a camera fixed to a movable platform, such as a vehicle, how a background other than the 3D object is seen varies as the camera moves, thus making it difficult to appropriately detect only a region showing the 3D object from the image captured by the camera. Consequently, a false positive detection (e.g., detection of an unnecessary background) or a false negative detection (e.g., detection of only part of the 3D object) may occur. Such a false positive detection and false negative detection could occur owing to variations in a sunshine condition, lighting condition, or the like on an image-capture surface (e.g., a road surface or a floor surface), even when the vehicle is stopped or the camera is fixed to a stationary platform (e.g., a building).

For a 3D-object detection image resulting from such a false positive detection or false negative detection, complex processing, such as pattern matching (see, for example, Japanese Unexamined Patent Application Publication Nos. 2010-056975 and 2007-129560), needs to be performed to accurately detect the ground side of the 3D object. Thus, a position accuracy is considerably reduced compared to cases in which no false positive/negative detection occurs. Such a reduction in the position accuracy adversely affects, for example, the precision of determining whether or not the detected 3D object is a stationary object or a movable body and whether or not the detected 3D object is approaching or moving away. The reduction in the position accuracy may thus lead to a decrease in the reliability of the camera-image processing system (e.g., a traffic impediment warning system or a monitoring camera system) employing the 3D-object detection. Accordingly, it is necessary to provide en early solution to such a problem.

SUMMARY OF THE INVENTION

The present invention has been made in view of the foregoing, and an object of the present invention is to provide a 3D-object detecting apparatus and a 3D-object detecting method which enable the 3D-object detection position accuracy to be improved and stabilized with a simple configuration and which enable the reliability of a system employing 3D-object detection to be improved In one aspect, a 3D-object detecting apparatus is provided. The 3D-object detecting apparatus has a single image-capture device provided at a predetermined position to capture an image of a predetermined image-capture region including a predetermined image-capture surface and that detects a 3D object on the image-capture surface on the basis of the captured image of the image-capture region. The 3D-object detecting apparatus may include: a detection-image creating device that detects the 3D object on the image-capture surface on the basis of the captured image and that creates a detection image in which a silhouette of only the detected 3D object is left by eliminating an unnecessary region other than the detected 3D object; a density-map creating device that prestores mask images, obtained by arranging virtual cuboids having a certain width, depth, and height at predetermined coordinate points in a coordinate plane set on the image-capture surface and projecting silhouettes of the arranged virtual cuboids onto an imaging plane of the image-capture device, for the corresponding coordinate points different from each other, that determines, as the 3D-object's spatial densities at the corresponding coordinate points, area ratios with respect to respective portions where the 3D-object silhouette in the detection image and the cuboid silhouettes in the mask images for the corresponding coordinate points overlap each other, and that arranges, in accordance with an arrangement sequence of the coordinate points, pixels for the respective coordinate points such that the pixels have pixel values corresponding to the determined spatial densities at the respective coordinate points, to thereby create a density map indicating distribution of the spatial densities on the image-capture surface; and a 3D-object position detecting device that extracts at least one high-density region in which the pixel value exceeds a threshold pixel value from the density map created by the density-map creating device and that detects, as the position of the 3D object corresponding to the high-density region, coordinates of a representative point that is included in the extracted high-density region and that is closest to the image-capture device.

Another aspect provides a 3D-object detecting method in which a single image-capture device for capturing an image of a predetermined image-capture region including a predetermined image-capture surface is provided at a predetermined position and a 3D object on the image-capture surface is detected based on the captured image of the image-capture region. The 3D-object detecting method may include: a step 1 of detecting the 3D object on the image-capture surface on the basis of the captured image and of creating a detection image in which a silhouette of only the detected 3D object is left by eliminating an unnecessary region other than the detected 3D object from the captured image; a step 2 of preparing mask images, obtained by arranging virtual cuboids having a certain width, depth, and height at predetermined coordinate points in a coordinate plane set on the image-capture surface and projecting silhouettes of the arranged virtual cuboids onto an imaging plane of the image-capture device, for the corresponding coordinate points different from each other, of determining, as the 3D-object's spatial densities at the corresponding coordinate points, area ratios with respect to respective portions where the 3D-object silhouette in the detection image created in the step 1 and the cuboid silhouettes in the mask images for the corresponding coordinate points overlap each other, and of arranging, in accordance with an arrangement sequence of the coordinate points, pixels for the respective coordinate points such that the pixels have pixel values corresponding to the determined spatial densities at the respective coordinate points, to thereby create a density map indicating distribution of the spatial densities on the image-capture surface; and a step 3 of extracting at least one high-density region in which the pixel value exceeds a threshold pixel value from the density map created in the step 2 and detecting, as the position of the 3D object corresponding to the high-density region, coordinates of a representative point that is included in the extracted high-density region and that is closest to the image-capture device.

By performing 3D-object position detection using a density map as in implementations of the present invention, high detection position accuracy is provided even for a detection image in which 3D-object false positive detection and/or false negative detection occurs. During creation of a density map, the mask images corresponding to the respective virtual cuboids arranged at coordinate points closer to the image-capture device have relatively larger cuboid silhouettes (than the silhouettes of the virtual cuboids arranged at coordinate points farther than the image-capture device). Thus, the area of the portion where each cuboid silhouette and the 3D object silhouette in the detection image overlap each other can be saved, so that the high-density region in the density map can be extended toward the image-capture device corresponding to the ground side of the 3D object. As a result, even when detection loss (false negative detection) of the ground side of a 3D object occurs in the detection image, the loss can be compensated for to thereby achieve high-accuracy position detection. On the other hand, since unnecessary portions other than the 3D object in the detection image often have a large share in the area of the detection image, the areas of the portions where such unnecessary portions overlap the cuboid silhouette in the mask image are also small. Consequently, small values are determined for the spatial densities in such unnecessary portions, thus not affecting the 3D-object position detection. As a result, even when the unnecessary portions other than the 3D object are falsely detected, it is possible to prevent the false detection from affecting the position accuracy. In addition, since complex processing, such as pattern matching, and a special position detecting configuration, such as a radar, are not required, the 3D-object position detection can be performed with a simple configuration and at lost cost. In addition, although the pattern matching involves a large amount of computation and can detect only the ground-contact position of an object stored as a template, implementations of the present invention makes it possible to quickly detect the ground-contact positions of all objects.

In some implementations of described 3D-object detecting apparatuses, preferably, the detection-image creating device repeatedly creates the detection image for each predetermined creation period; the density-map creating device creates a latest one of the density map, each time the detection image is created; and the 3D-object position detecting device detects a latest position of the 3D object, each time the latest density map is created. The 3D-object detecting apparatus may further include: a target-history recording device that records, as a history of a target to be tracked, the latest position of the 3D object to a storage unit in association with detection time of the latest 3D-object position; a movement-trajectory estimating device that estimates a movement trajectory of the target on the basis of the recorded target history; and an approaching-object determining device that determines whether or not the target corresponding to the movement trajectory is an approaching object, on the basis of the estimated movement trajectory. In some implementations of a 3D-object detecting method, preferably, in the step 1, the detection image is repeatedly created for each predetermined creation period; in the step 2, a latest one of the density map is created each time a latest one of the detection image is created in the step 1; and in the step 3, a latest position of the 3D object is detected each time the latest density map is created in the step 2. The 3D-object detecting method may further include: a step 4 of recording, as a history of a target to be tracked, the latest 3D-object position detected in the step 3 to a storage unit in association with detection time of the latest 3D-object position; a step 5 of estimating a movement trajectory of the target on the basis of the target history recorded in the step 4; and a step 6 of determining whether or not the target corresponding to the movement trajectory is an approaching object, on the basis of the movement trajectory estimated in the step 5.

Since a 3D object (a target) is tracked through monitoring of changes with time in the high-accuracy detection position based on the density map, whether or not the 3D object is an object approaching the image-capture device can be determined with high accuracy.

In implementations of the 3D-object detecting apparatus, upon detecting the latest 3D-object position, the target-history recording device may estimate a current position of the target already recorded as the history on the basis of the history, compares the estimated current target position with the detected latest 3D-object position. Preferably, when the estimated current target position and the detected latest 3D-object position are regarded as being close to each other, the target-history recording device additionally records the detected latest 3D-object position to the history of the target corresponding to the estimated current target position in association with the detection time of the latest 3D-object position. Preferably, when the estimated current target position and the detected latest 3D-object position are regarded as being far from each other, the target-history recording device newly records the detected latest 3D-object position to the storage unit as a history of a new target in association with the detection time of the latest 3D-object position. In the 3D-object detecting method according to the second aspect of the present invention, the step 4 may include: a step 4a of determining, when the latest 3D-object position is detected in the step 3, a current position of the target already recorded in the history on the basis of the history and of comparing the estimated current target position with the detected latest 3D-object position, and a step 4b of additionally recording the detected latest 3D-object position to the history of the target corresponding to the estimated current target position in association with the detection time of the latest 3D-object position, when the estimated current target position and the detected latest 3D-object position are regarded as being close to each other, and of newly recording the detected latest 3D-object position to the storage unit as a history of a new target in association with the detection time of the latest 3D-object position, when the estimated current target position and the detected latest 3D-object position are regarded as being far from each other.

In some implementations of the present invention, whether a newly detected 3D-object position is to be associated with a 3D object being already tracked or is to be regarded as an initial position of a new object to be tracked can be appropriately selected based on a distance relationship with the estimated current position of the 3D object being already tracked. Thus, whether or not the 3D object is an approaching object can be determined with higher accuracy.

In implementations of described 3D-object detecting apparatuses, preferably, when multiple targets whose estimated current target positions are regarded as being close to the detected latest 3D-object position are present, the target-history recording device additionally records the detected latest 3D-object position to, of the histories of the multiple objects, the history of the target whose estimated current target position is closest to the detected latest 3D-object position. In implementations of described 3D-object detecting methods, preferably, in the step 4b, when multiple targets whose estimated current target positions are regarded as being close to the detected latest 3D-object position are present, the detected latest 3D-object position is additionally recorded to, of the histories of the multiple objects, the history of the target whose estimated current target position is closest to the detected latest 3D-object position.

When multiple 3D objects being already tracked are present in the vicinity of the position of a newly detected 3D object, the position of the newly detected 3D object can also be associated with a most identical one of the multiple 3D objects being tracked, on the basis of the distance relationship with the estimated current positions of the multiple 3D objects being tracked. Thus, whether or not the 3D object is an approaching object can be determined with higher accuracy.

In implementations of 3D-object detecting apparatuses, the image-capture device may be provided on a movable body, and the 3D-object detecting apparatus may further include a movement-amount obtaining device that obtains an amount of movement of the movable body. On the basis of the obtained amount of movement of the movable body, the target-history recording device may correct the 3D-object position in the history of the target. In implementations of 3D-object detecting methods, the image-capture device may be provided on a movable body, and the 3D-object detecting method may further include a step 7 of obtaining an amount of movement of the movable body, and a step 8 of correcting the 3D-object position in the history of the target, on the basis of the amount of moveable-body movement obtained in the step 7.

In addition, even when the image-capture device moves in conjunction with the movable body, the past tracking result can be corrected according to the movement. Thus, the presence/absence of an approaching object can be stably determined through appropriate 3D-object tracking.

Implementations of 3D-object detecting apparatuses may further include a warning output device that determines, on the basis of the estimated movement trajectory of the target, a time-to-collision of the target determined by the approaching-object determining device to be an approaching object. Preferably, when the determined time-to-collision is less than or equal to a threshold time, the warning output device outputs a warning with respect to the target. Implementations of 3D-object detecting methods may further include a step 9 of determining, on the basis of the estimated movement trajectory of the target, a time-to-collision of the target determined in the step 6 to be an approaching object, and of outputting a warning with respect to the target when the determined time-to-collision is less than or equal to a threshold time.

Outputting of a warning with respect to the 3D object can be controlled based on a high-accuracy detection result indicating the position of the 3D object and an accurate determination result indicating whether or not the 3D object is an approaching object. Thus, it is possible to improve the reliability of the warning system.

In implementations of 3D-object detecting apparatuses, the image-capture device may be provided on a movable body, and the 3D-object detecting apparatus may further include: a difference-area calculating device that calculates, each time the latest detection image is created, a difference area between the latest detection image and the detection image created previous thereto; and a second approaching-object determining device that determines whether or not the 3D object corresponding to the detection image is an approaching object, on the basis of the difference area calculated by the difference-area calculating device. The second approaching-object determining device may include: a difference-area increase determining device that determines whether or not the difference area has increased, on the basis of a change in the calculated difference area; a movement determining device that determines whether or not the movable body is moving; and a difference-area change-amount determining device that determines whether or not the amount of change in the calculated difference area is larger than or equal to a threshold amount of change. Preferably, when one of a condition (a) that it is determined that the difference area has increased and the movable body is not moving and a condition (b) that it is determined that the difference area has increased, the movable body is moving, and the amount of change in the difference area is smaller than the threshold amount of change is satisfied, the second approaching-object determining device determines that the 3D object is an approaching object. Preferably, when neither of the conditions (a) and (b) is satisfied, the second approaching-object determining device determines that the 3D object is not an approaching object. Preferably, with respect to the 3D object determined by the second approaching-object determining device not to be an approaching object, the warning output device does not output the warning even when the time-to-collision for the 3D object is less than or equal to the threshold time. In the 3D-object detecting method according to the second aspect of the present invention, the image-capture device may be provided on a movable body, and the 3D-object detecting method may further include: a step 10 of calculating, each time the latest detection image is created in the step 1, a difference area between the latest detection image and the detection image created previous thereto; and a step 11 of determining whether or not the 3D object corresponding to the detection image is an approaching object, on the basis of the difference area calculated in the step 10. In the step 11, preferably, when one of a condition (a) that it is determined based on a change in the determined difference area that the difference area has increased and it is determined that the movable body is not moving and a condition (b) that it is determined based on a change in the determined difference area that the difference area has increased, it is determined that the movable body is moving, and it is determined the amount of change in the determined difference area is smaller than the threshold amount of change is satisfied, it is determined that the 3D object is an approaching object. Preferably, when neither of the conditions (a) and (b) is satisfied, it is determined that the 3D object is not an approaching object. In the step 9, preferably, with respect to the 3D object determined in the step 11 not to be an approaching object, the warning is not output even when the time-to-collision for the 3D object is less than or equal to the threshold time.

Outputting of a warning can be controlled through the adjacent-object determination based on the difference image in conjunction with the approaching-object determination based on the 3D-object detection position. Thus, a more accurate determination result indicating whether or not the 3D object is an approaching object can be reflected to determine whether or not a warning is to be output. This makes it possible to further improve the reliability of the warning system and makes it possible to reduce the user's discomfort due to outputting of an unnecessary warning. In particular, the present embodiment is advantageously used to prevent, when the difference area increases greatly as a result of movement of the image-capture device in conjunction with the movable body under a situation in which a detected 3D object is stationary (particularly, near the image-capture device), a false detection, i.e., erroneously regarding that increase as being due to approaching of a 3D object.

Implementations of the 3D-object detecting apparatuses, preferably, when the warning output device already outputs the warning with respect to the 3D object determined to have a difference area whose amount of change is larger than or equal to the threshold amount of change and thus determined by the second approaching-object determining device not to be an approaching object, the warning output device continuously output the warning. In implementations of 3D-object detecting methods, preferably, in the step 9, when the warning is already output with respect to the 3D object determined to have a difference area whose amount of change is larger than or equal to the threshold amount of change and thus determined in the step 11 not to be an approaching object, the warning is continuously output.

In addition, when a warning is already output with respect to a 3D object determined not to be an approaching object on the basis of the difference area, the outputting of the warning is maintained. As a result, it is possible to prevent the user's discomfort due to sudden stopping of the warning even through the situation in which the 3D object is approaching does not change.

According to the present invention, the accuracy of detecting a 3D-object position can be improved and stabilized with a simple configuration and the reliability of the system employing 3D-object detection can be improved.

BRIEF DESCRIPTION OF THE DRAWINGS

FIG. 10 is a table schematically illustrating histories of targets in the first embodiment of the 3D-object detecting apparatus;

DESCRIPTION OF THE PREFERRED EMBODIMENTS

First Embodiment

A first embodiment of a 3D-object detecting apparatus will be described below with reference to FIGS. 1 and 13.

Figure 1:
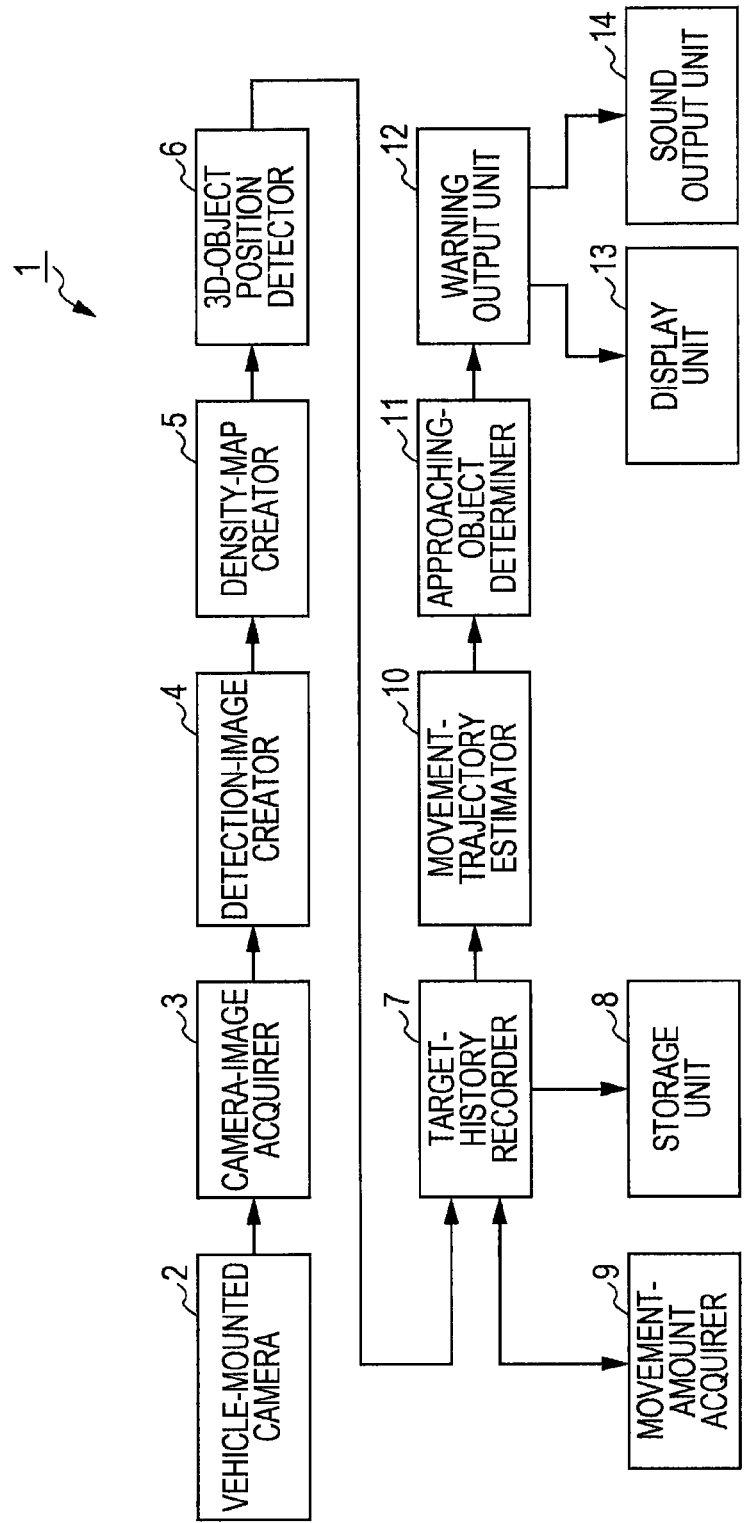
FIG. 1 is a block diagram illustrating a first embodiment of a 3D-object detecting apparatus.

FIG. 1 is a block diagram illustrating a 3D-object detecting apparatus 1 mounted on a vehicle, which is a movable body. As illustrated in FIG. 1, the 3D-object detecting apparatus 1 has a vehicle-mounted camera 2, which serves as a single image-capture device. The vehicle-mounted camera 2 is mounted at a predetermined position of the vehicle.

Upon being triggered by a user operation using an input device (e.g., an operation button, not illustrated), a predetermined drive operation of the vehicle, or the like, the vehicle-mounted camera 2 is adapted to capture an image of an image-capture region in the vehicle's surroundings (including a road surface, which is an image-capture surface) in a viewing angle at a predetermined frame rate. Examples of the "road surface" referred to herein include not only the road surface of a road, but also a pavement in a parking lot, a ground surface, and other surfaces on which vehicles are presumed to travel. The 3D-object detecting apparatus 1 is adapted to detect 3D objects on the road surface on the basis of the image captured by the vehicle-mounted camera 2.

The vehicle-mounted camera 2 may be a wide-viewing-angle camera having a wide-angle lens, such as a fisheye lens, or may be a digital camera having a solid-state image-capture element (an imaging plane), such as a CCD (charge coupled device) or CMOS (complementary metal-oxide semiconductor). The vehicle-mounted camera 2 may be a back camera that is mounted to a rear portion (e.g., a rear license garnish portion) of the vehicle with the camera attitude being oriented so as to look diagonally down at the road surface behind the vehicle to capture an image of a predetermined image-capture region centering a region behind the vehicle. The vehicle-mounted camera 2 may also be a front camera that is mounted to a front portion (e.g., an emblem portion) of the vehicle with the camera attitude being oriented so as to look diagonally down at the road surface ahead of the vehicle to capture an image of a predetermined image-capture region centering a region ahead of the vehicle. Alternatively, the vehicle-mounted camera 2 may be a left-side camera that is mounted to a left-side portion (e.g., a left door mirror) of the vehicle with the camera attitude being oriented so as to look diagonally down at the road surface to the left of the vehicle to capture an image of a predetermined image-capture region centering a region to the left of the vehicle. In addition, the vehicle-mounted camera 2 may also be a right-side camera that is mounted to a right-side portion (e.g., a right door mirror) of the vehicle with the camera attitude being oriented so as to look diagonally down at the road surface to the right of the vehicle to capture an image of a predetermined image-capture region centering a region to the right of the vehicle.

As illustrated in FIG. 1, the 3D-object detecting apparatus 1 has a camera-image acquirer 3. Each time an image is captured by the vehicle-mounted camera 2, the image is sequentially input to the camera-image acquirer 3.

Figure 2:
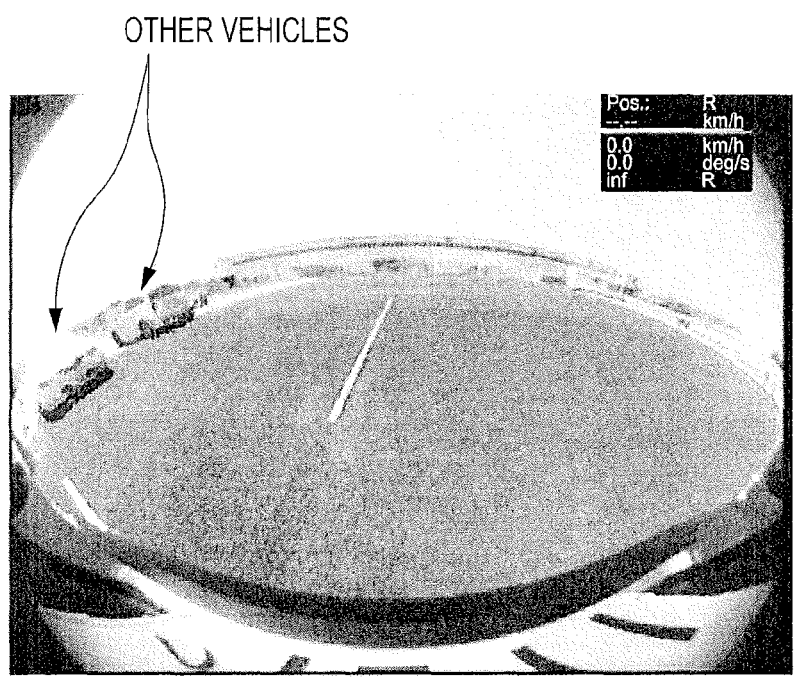
FIG. 2 illustrates one example of an image captured by a vehicle-mounted camera in the first embodiment of the 3D-object detecting apparatus.
Figure 3:
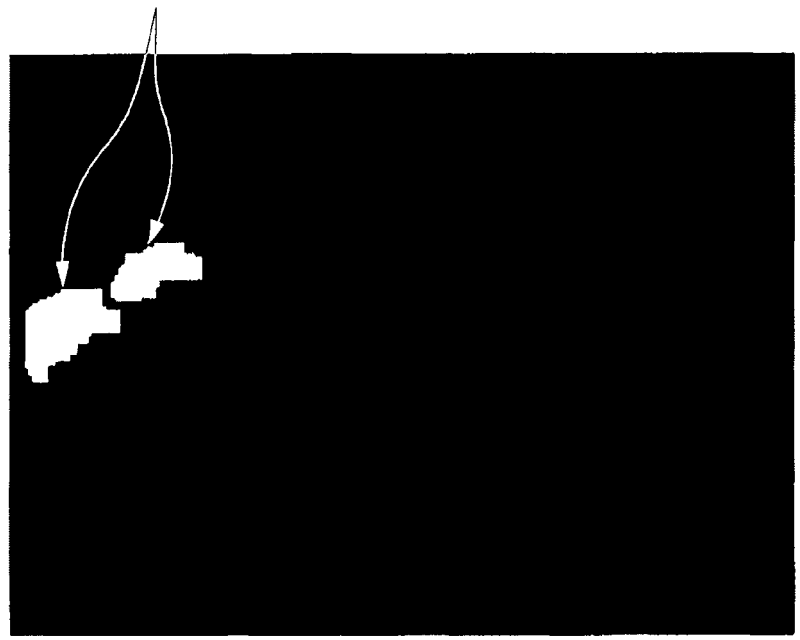
FIG. 3 illustrates one example of a detection image in the first embodiment of the 3D-object detecting apparatus.

As illustrated in FIG. 1, the 3D-object detecting apparatus 1 further has a detection-image creator 4, which serves as a detection-image creating device. The detection-image creator 4 is adapted to sequentially obtain the image, captured by the vehicle-mounted camera 2 and acquired by the camera-image acquirer 3, from the camera-image acquirer 3 and to detect a 3D object on the road surface through image recognition on the basis of the obtained captured image. The 3D-object detection may be realized by any method that can determine which pixel region in a captured image corresponds to a 3D object and may also be implemented by the above-described background differencing method or another known 3D-object detection method. When a 3D object is detected in the manner described above, the detection-image creator 4 is adapted to create a detection image in which a silhouette of only the detected 3D object is left by eliminating an unnecessary region, other than the detected 3D object, from the captured image. The detection image may also be an image resulting from distortion correction. In this case, it is assumed that the captured image is an image showing two other vehicles side by side at the left-end side of the image, as illustrated in FIG. 2. In this case, when the detection-image creator 4 detects those two other vehicles as 3D objects, for example, an image showing silhouettes (in white) corresponding to the two other vehicles and a background (in black) other than the silhouettes is obtained as a detection image, as illustrated in FIG. 3. The background in the detection image, however, is left collaterally in order to define the in-image positions and areas of the silhouettes of the 3D objects (e.g., the other vehicles in FIG. 3) and includes no image reflecting the captured image.

For example, for 3D-object detection using the background differencing method, the detection-image creator 4 obtains a difference between temporally previous and subsequent captured images to detect a 3D object corresponding to a difference image representing the difference. When such difference-obtaining processing is applied to all pixels in the captured images, the amount of processing load may become too large. Accordingly, in such a case, the difference between the captured images may be obtained after reducing the size of the captured images by downsampling the pixels thereof. In such a case in which the difference between the captured images is obtained to detect a 3D object and then the downsampled pixels of the captured images are restored to return the size thereof to their original size to create a detection image, the created detection image shows a group of dots reflecting the downsampling of the pixels, not consistent silhouettes as illustrated in FIG. 3. The period of creating such a detection image may be the same as the period of obtaining the captured image or may be different from the period of obtaining the captured image (e.g., may be a multiple of or shorter than the period thereof).

Referring back to FIG. 1, the 3D-object detecting apparatus 1 has a density-map creator 5, which serves as a density-map creating device. The density-map creator 5 is adapted to create a density map on the basis of the detection image created by the detection-image creator 4. The density map is an image showing distribution of a spatial density of a 3D object on a road surface. This density-map creation is repeatedly performed each time the detection-image creator 4 creates a latest one of the detection image.

Figure 4:
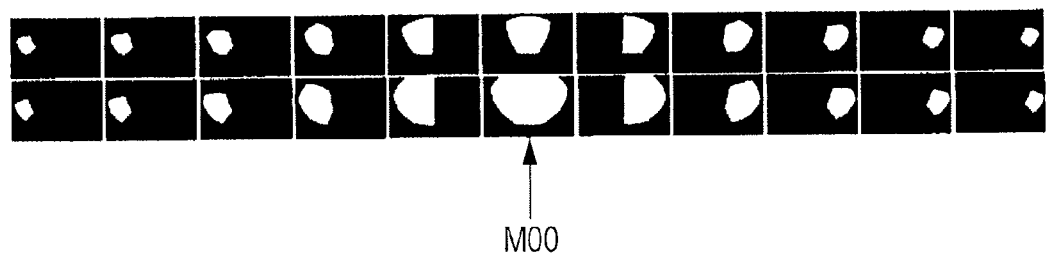
FIG. 4 illustrates one example of mask images in the first embodiment of the 3D-object detecting apparatus.
Figure 5:
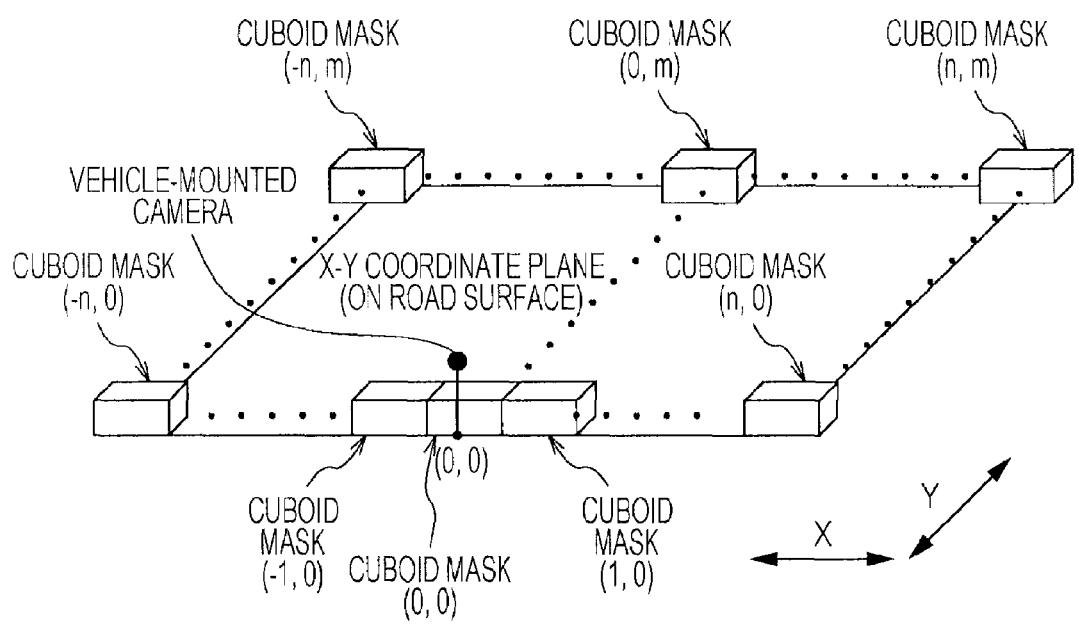
FIG. 5 schematically illustrates one implementation of a mask-image creation method in the first embodiment of the 3D-object detecting apparatus.

For creation of the density map, the density-map creator 5 first pre-stores, as a premise, multiple mask images Mij (i and j are integers) as illustrated in FIG. 4. How the mask images Mij are created will now be described. As illustrated in FIG. 5, a virtual coordinate plane (with X-Y coordinates) that is coplanar with a road surface is set (arranged) on the road surface. This coordinate plane is a part of a 3D-world coordinate system, but is a coordinate plane to which a Z axis (in the height direction) is perpendicular and in which Z coordinates are constant. Thus, the Z coordinates at coordinate points in the coordinate plane are not considered in the following description. As illustrated in FIG. 5, the coordinate plane has its origin (0, 0) at a point corresponding to the position (the 3D-object position) of the vehicle-mounted camera 2 vertically projected on the coordinate plane.

When the vehicle-mounted camera 2 is a back camera, an X-axis direction in the coordinate plane illustrated in FIG. 5 corresponds to a vehicle-width direction and a Y-axis direction corresponds to a vehicle-length direction. As illustrated in FIG. 5, the X coordinates to the right of the origin (0, 0), which is the closest to the vehicle-mounted camera 2, may be positive and the X coordinates to left of the origin (0, 0) may be negative. All of the Y coordinates in FIG. 5 are positive. The coordinate plane and the 3D-world coordinate system may also be ones set in association with known camera parameters (e.g., external parameters) of the vehicle-mounted camera 2. Next, as illustrated in FIG. 5, virtual cuboid masks (cuboids) having a certain width, depth, and height are arranged at predetermined coordinates (i, j) in the coordinate plane set as described above. The cuboid masks are used to create the corresponding mask images Mij. In the example of FIG. 5, multiple virtual cuboid masks are simultaneously arranged. However, for creation of the individual mask images Mij, the virtual cuboid masks corresponding to the individual mask images Mij are individually arranged.

Various values may be selected for the size and the arrangement pitch of the cuboid masks in accordance with an actual application. For example, when it is assumed that all cuboid masks are simultaneously arranged, values for the size and the arrangement pitch may be selected such that the adjacent ones of the cuboid masks contact or overlap each other. Next, the silhouettes of the virtual cuboid masks arranged as described above are projected (imaged) on the imaging plane of the vehicle-mounted camera 2 to thereby obtain images for the corresponding coordinate points. The images obtained for the corresponding coordinate points correspond to the mask images Mij illustrated in FIG. 4.

As illustrated in FIG. 4, in each mask image Mij, the silhouette of the virtual cuboid mask arranged at the corresponding coordinate point is shown as a projection image in white and other regions are shown as an image in black. All of the mask images Mij have the same size as the captured image. Since the mask images Mij are created based on the cuboid masks having the same size, the mask image M (i=0, j=0) of the mask images Mij which corresponds to the origin (0, 0) closest to the vehicle-mounted camera 2 has a largest cuboid-mask silhouette area. A preferable value may also be selected for the arrangement pitch (corresponding to the distance pitch in the actual world) of i and j in the coordinates, in accordance with an actual application. Given that the cuboid masks are arranged at all coordinates (i, j) in the coordinate plane, the total number of mask images Mij is expressed by (2n+1)×(m+1), where n indicates the upper limit of the X coordinate i, −n indicates the lower limit of the X coordinate i, and m indicates the upper limit of the Y coordinate j (the lower limit is 0). The creation of the mask images Mij by assuming such virtual cuboid masks may also be performed utilizing known camera parameters (internal/external parameters) of the vehicle-mounted camera 2.

Figure 6:
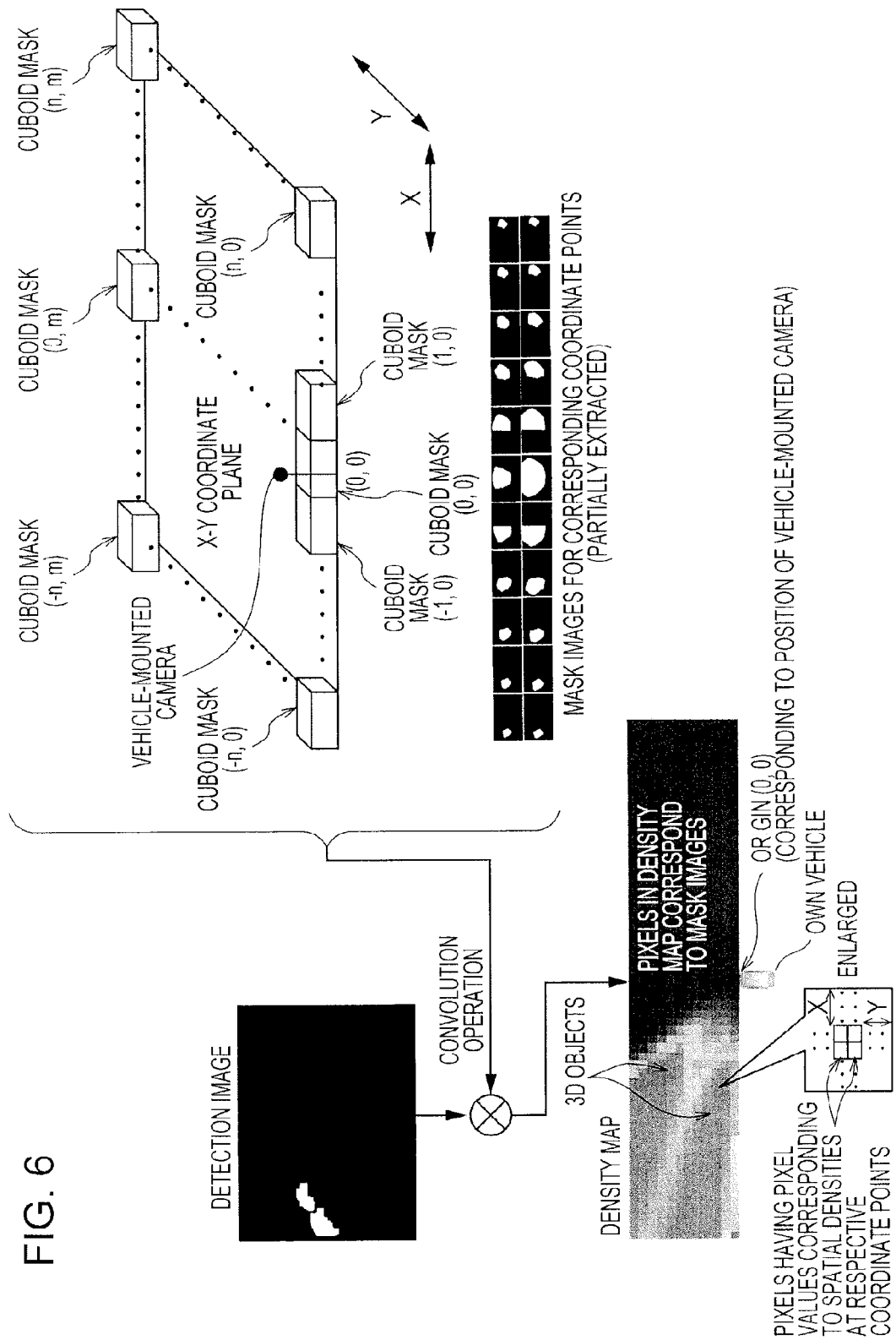
FIG. 6 schematically illustrates one implementation of a density-map creation method in the first embodiment of the 3D-object detecting apparatus.

After pre-storing the mask images Mij for (or in association with) the corresponding coordinate points, the density-map creator 5 performs, for each coordinate point, a convolution operation for calculating an area sij of a portion where the 3D-object silhouette in the detection image created by the detection-image creator 4 and the cuboid-mask silhouette in the mask image Mij at the corresponding coordinate point overlap each other. The area sij may be determined as the number of pixels in the pixel region corresponding to the overlapping portion. FIG. 6 conceptually illustrates such a convolution operation.

The density-map creator 5 divides the thus-calculated area sij of the overlapping portion for each coordinate point by an area Sij (which may be the number of pixels) of the cuboid-mask silhouette in the mask image Mij for each coordinate point, to thereby calculate, for each coordinate point, the ratio (sij/Sij) of the area of the overlapping portion to the area of the cuboid-mask silhouette. The density-map creator 5 uses the determined area ratio (sij/Sij) for each coordinate point as the 3D-object's spatial density dij at the coordinate point. That is, dij=sij/Sij is given.

Figure 7:
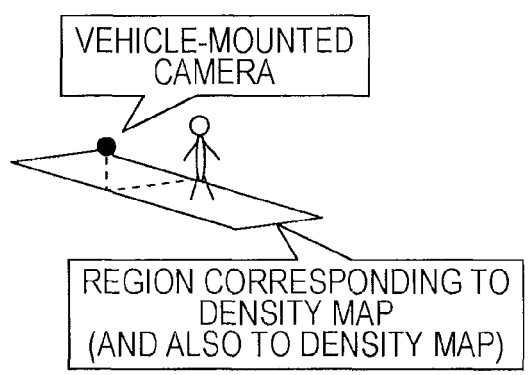
FIG. 7 is a perspective view schematically illustrating a region corresponding to the density map in the first embodiment of the 3D-object detecting apparatus.

The density-map creator 5 then arranges pixels for the respective coordinate points such that the pixels have pixel values corresponding to the determined spatial densities dij at the coordinate points. A larger pixel value is set for the pixel having a higher spatial density dij. The pixels arranged for the coordinate points are arranged according to an arrangement sequence of the coordinate points. As a result, a density map as illustrated in FIG. 6 is created. As illustrated in FIG. 6, the density map is a consistent image that is associated with the above-described coordinate plane (see FIG. 5) and that is constituted by the pixels having the pixel values reflecting the spatial densities dij at the respective coordinate points. The origin of this density map also corresponds to the above-described coordinate-plane origin (0, 0) that is the closest to the position of the vehicle-mounted camera 2. FIG. 7 schematically illustrates a region represented by such a density map. As illustrated in FIG. 6, a 3D object on the density map appears as a wedge-shaped image extending radially from the origin side toward the periphery side. When N 3D objects are present adjacent to each other, as illustrated in FIG. 6, the 3D objects appear as an image showing a combination of N wedges (two wedges in the example of FIG. 6) on the density map. The pixel values (i.e., the spatial densities) of the pixels constituting such a wedge image have the following features:
  (i) The pixel values in regions outside the wedge, including the region from the origin to the tip portion of the wedge, are 0;
  (ii) The pixel value increases, as the distance relative to the tip portion of the wedge increases from the origin; and
  (iii) The pixel values are saturated (i.e., reach their maximum) in the vicinity of the coordinates corresponding to the actual position of the 3D object.

Referring back to FIG. 1, the 3D-object detecting apparatus 1 has a 3D-object position detector 6, which serves as a 3D-object position detecting device. The 3D-object position detector 6 is adapted to detect the position of a 3D object on the basis of the density map created by the density-map creator 5. This 3D-object position detection is repeatedly performed each time the density-map creator 5 creates the latest density map.

Figure 8A:
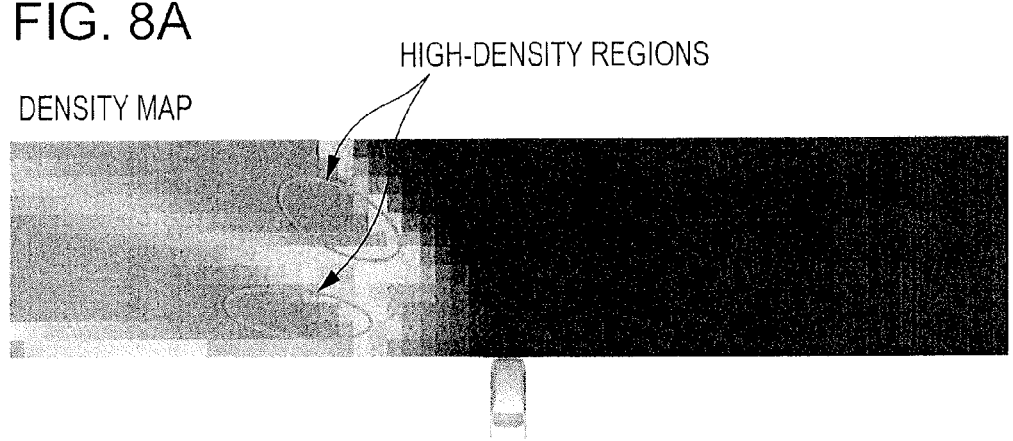
FIGS. 8A and 8B schematically illustrate one implementation of a depth-map creation method in the first embodiment of the 3D-object detecting apparatus.

For detecting the position of a 3D object, the 3D-object position detector 6 first extracts, from the density map, a high-density region in which the pixel values reflecting the spatial densities dij exceed a preset threshold pixel value. The high-density region is extracted as a collection of pixels. FIG. 8A is a conceptual view illustrating a state in which high-density regions (within oval frames n FIG. 8A) are extracted on the density map. When multiple wedge shapes are obtained on the density map, as illustrated in FIG. 8A, a number of high-density regions which is the same as the number of the wedge shapes are extracted.

Figure 8B:
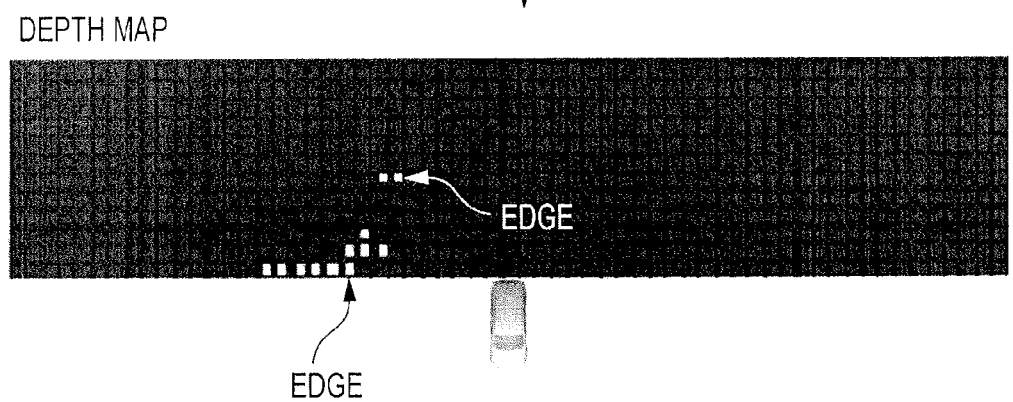

Next, the 3D-object position detector 6 extracts, in the high-density region(s) extracted as described above, an edge or edges adjacent to the origin. FIG. 8B is a conceptual view illustrating a state in which such edges are extracted. As illustrated in FIG. 8B, the extracted edges are obtained as an image having the same size as a density map obtained by eliminating portions except the pixels corresponding to the edges from the density map illustrated in FIG. 8A. Since the obtained image shows the ground sides of the 3D objects and is associated with the depth dimension (depth), it is hereinafter referred to as a "depth map".

Figure 9A:
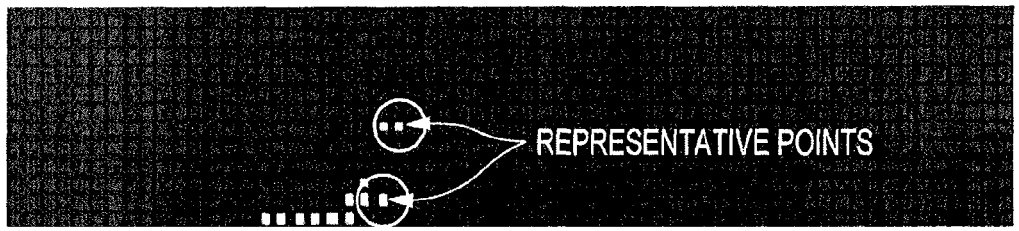
FIGS. 9A and 9B schematically illustrate one implementation of a 3D-object position detecting method in the first embodiment of the 3D-object detecting apparatus.
Figure 9B:

The 3D-object position detector 6 extracts, from the edges extracted as described above, the coordinates (x, y) of a representative point that is included in each high-density region and that is the closest to the origin. The 3D-object position detector 6 then determines (detects) the extracted coordinates of the representative point as the position (x, y) of the 3D object corresponding to the high-density region. FIGS. 9A and 9B are conceptual views illustrating such position detection performed by the 3D-object position detector 6. In the example of FIGS. 9A and 9B, two representative points are detected. These representative points indicate the positions of the two other vehicles detected by the detection-image creator 4. FIG. 9B illustrates a ¼ scale image of the depth map in FIG. 9A, with only the representative points being left.

Referring back to FIG. 1, the 3D-object detecting apparatus 1 has a target-history recorder 7, which serves as a target-history recording device. The target-history recorder 7 is adapted to receive, each time the 3D-object position detector 6 detects (updates) a latest 3D-object position, sequential data indicating the latest 3D-object position from the 3D-object position detector 6. The target-history recorder 7 is also adapted to record, as a history of a target to be tracked, the received latest 3D-object position to a storage unit 8 in association with the detection time of the latest 3D-object position. The 3D-object position detector 6 may obtain the detection time of the latest 3D-object position simultaneously with the detection thereof or the target-history recorder 7 may obtain the detection time of the latest 3D-object position. Means for obtaining such a detection time may be implemented by any type of known current-time obtaining means. Examples include a radio time signal, GPS (global positioning system) information received by a GPS receiver, and a time-indicating function of the 3D-object detecting apparatus 1. The time may also be expressed by a value that the 3D-object detecting apparatus 1 counts up in synchronization with the period of obtaining the captured image or the period of creating the detection image. FIG. 10 schematically illustrates such target histories. In FIG. 10, the detection position (x, y) of each 3D object is recorded in association with the detection time and target identification information (e.g., a target name or a target number).

Each time the 3D-object position detector 6 detects a latest 3D-object position, the target-history recorder 7 repeatedly performs target-history recording (tracking) as described above. Upon detecting a latest 3D-object position in the process of repeatedly performing the target-history recording, the target-history recorder 7 is adapted to estimate the current position of a target already recorded in the history, on the basis of the history.

The current target position may be estimated, for example, based on the target's speed (vector) obtained during the previous position-detection time, the previous detection position, and a time elapsed from the previous detection time to the current time. In such a case, the target's speed obtained during the previous position-detection time may be determined by obtaining the ratio of the amount of change in the previous detection position of the target relative to the previous-but-one detection position to the amount of change in the previous detection time relative to the previous-but-one detection time.

The target-history recorder 7 then compares the thus-estimated current target position with the detected latest 3D-object position. When the estimated current target position and the detected latest 3D-object position are regarded as being close to each other, the target-history recorder 7 is adapted to additionally record the detected latest 3D-object position to the history of the target corresponding to the estimated current target position in association with the detection time of the latest 3D-object position. On the other hand, when the estimated current target position and the detected latest 3D-object position are regarded as being far from each other, the target-history recorder 7 is adapted to record, as a history of a new target, the detected latest 3D-object position to the storage unit 8 in association with the detection time of the latest 3D-object position.

In such a process in which the target-history recorder 7 additionally records or newly records the detected latest target position on the basis of the estimated current target position, there are cases in which multiple targets whose estimated current target positions are regarded as being close to the detected latest 3D-object position are present. In such a case, the target-history recorder 7 may also be adapted to rewrite the detected latest 3D-object position to, of the histories of the multiple targets, the history of one target whose estimated current target position is the closest to the detected latest 3D-object position. Alternatively, when multiple targets are present in the vicinity of the detected latest 3D-object position, the target-history recorder 7 may temporarily additionally record the detected latest 3D-object position to all of the histories of those targets. In such a case, for a target that has become regarded as being far from the detected latest 3D-object position through subsequent position detection, the target-history recorder 7 may later delete, from the history of that target, the time and position corresponding to the detected position of the target.

Figure 11:
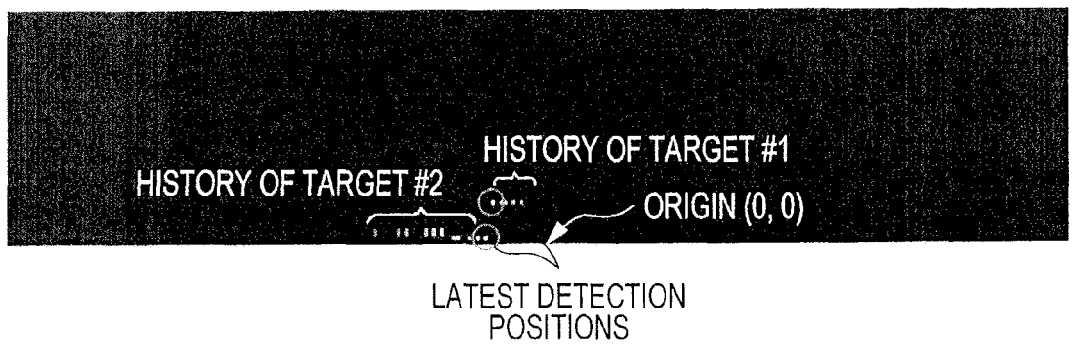
FIG. 11 schematically illustrates a state in which targets are tracked in the first embodiment of the 3D-object detecting apparatus.

The target-history recorder 7 is further adapted to correct (shift/rotate), in the process of repeatedly performing such target-history recording, the detection position in the target history on the basis of the amount of vehicle movement acquired by a movement-amount acquirer 9, which serves as a movement-amount obtaining device illustrated in FIG. 1. In this case, the detection position in the history is one detected using the coordinate system having the origin (0, 0) corresponding to the position of the vehicle-mounted camera 2 (in the past) when the corresponding detection was performed. Thus, at the present time when the vehicle-mounted camera 2 has moved in conjunction with movement of the vehicle, the origin (in the coordinate system) has also been displaced. Correspondingly, the detection position in the history is also needed to be offset. For such a reason, the history is corrected as described above. The movement-amount acquirer 9 may obtain the amount of vehicle movement through estimation on the basis of a difference (a change with time) between images captured by the vehicle-mounted camera 2 or may obtain the amount of vehicle movement by using a vehicle-speed sensor, acceleration sensor, gyro sensor, or the like. With respect to a target history to which a latest detection position has not been additionally recorded for a predetermined period of time, the target-history recorder 7 may discard the target history, regarding that sight of the corresponding target is lost. FIG. 11 illustrates, on a ¼ scale image of the depth map, target histories recorded by the target-history recorder 7 and the latest target detection positions. A target #1 and a target #2 in FIG. 11 correspond to the two other vehicles detected by the detection-image creator 4.

Referring back to FIG. 1, the 3D-object detecting apparatus 1 has a movement-trajectory estimator 10, which serves as a movement-trajectory estimating device. The movement-trajectory estimator 10 is adapted to estimate a movement trajectory of a target (a 3D object) on the basis of the target history recorded by the target-history recorder 7. The movement-trajectory estimator 10 is adapted to estimate the movement trajectory of a target on the basis of the target history, assuming that the target moves according to a predetermined motion model.

A description below will be given assuming that a target performs uniform linear motion. First, given that a target history indicates (ti, xi, yi), where 1≤i≤n. In this case, ti indicates the detection time of a target (a 3D object), xi and yi indicate the position of the target detected at time ti, and n indicates the number of history elements used for estimating a movement trajectory. A preferable value that does not cause a delay in warning timing (described below) may be selected as the value of n. Since it is assumed in this case that the target performs uniform linear motion, a target position (xt, yt) at time T=t is expressed as the following expressions by using a speed vector (vx, vy) and a target position (x0, y0) at time T=0.

$$xt=vx \cdot t+x0 \quad (1)$$

$$yt=vy \cdot t+y0 \quad (2)$$

Next, vx, vy, x0, and y0 are determined by regarding expression (1) as a regression line of a point group (ti, xi) and regarding expression (2) as a regression line of a point group (ti, yi). Using a least-squares method, those values are determined as:

$$vx=\{n\Sigma(ti \cdot xi)-\Sigma ti\Sigma xi\}/\{n\Sigma ti2-(\Sigma ti)2\}, \text{ where } \Sigma \text{ assumes } i=1 \text{ to } n \quad (3)$$

$$vy=\{n\Sigma(ti \cdot yi)-\Sigma ti\Sigma yi\}/\{n\Sigma ti2-(\Sigma ti)2\} \quad (4)$$

$$x0=(\Sigma xi-vx\Sigma ti)/n \quad (5)$$

$$y0=(\Sigma yi-vy\Sigma ti)/n \quad (6)$$

Figure 12:
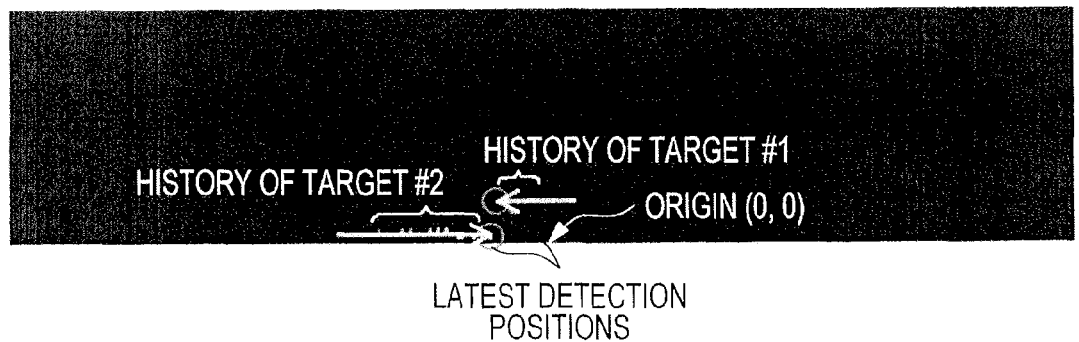
FIG. 12 schematically illustrates a state in which movement trajectories of the targets are estimated in the first embodiment of the 3D-object detecting apparatus.

FIG. 12 illustrates an image obtained by superimposing speed vectors, determined through the movement-trajectory estimation performed by the movement-trajectory estimator 10, onto an image that is similar to the one illustrated in FIG. 11. According to a result of such movement-trajectory estimation, since the target #1 has a speed vector that exhibits moving away from the origin (0, 0) corresponding to the position of the vehicle-mounted camera 2, it can be known that the target #1 is moving away from the vehicle, and since the target #2 has a speed vector that exhibits approaching the origin, it can be known that the target #2 is approaching the vehicle.

Alternatively, assuming any other type of motion model (e.g., circular movement) in accordance with an actual application, the movement-trajectory estimator 10 may also perform calculation according to the motion model to estimate the movement trajectory.

Referring back to FIG. 1, the 3D-object detecting apparatus 1 has an approaching-object determiner 11, which serves as an approaching-object determining device. On the basis of the movement trajectory estimated by the movement-trajectory estimator 10, the approaching-object determiner 11 is adapted to determine whether or not a target corresponding to the movement trajectory is an approaching object. In the case of FIG. 11, it is determined that the target #1 is not an approaching object and the target #2 is an approaching object. Upon determining that the target is not an approaching object, the approaching-object determiner 11 may also make a destination as to whether or not the target is a stationary object or an object moving away.

As illustrated in FIG. 1, the 3D-object detecting apparatus 1 further has a warning output unit 12, which serves as a warning output device. The warning output unit 12 is adapted to determine a time-to-collision (TTC) of the target determined by the approaching-object determiner 11 to be an approaching object, on the basis of the movement trajectory estimated by the movement-trajectory estimator 10. The time-to-collision may also be determined based on the position (the origin) of the vehicle-mounted camera 2, the position and the speed of the target, and so on. The warning output unit 12 is adapted to output a warning with respect to the corresponding target when the determined time-to-collision is less than or equal to a preset threshold time.

Figure 13:
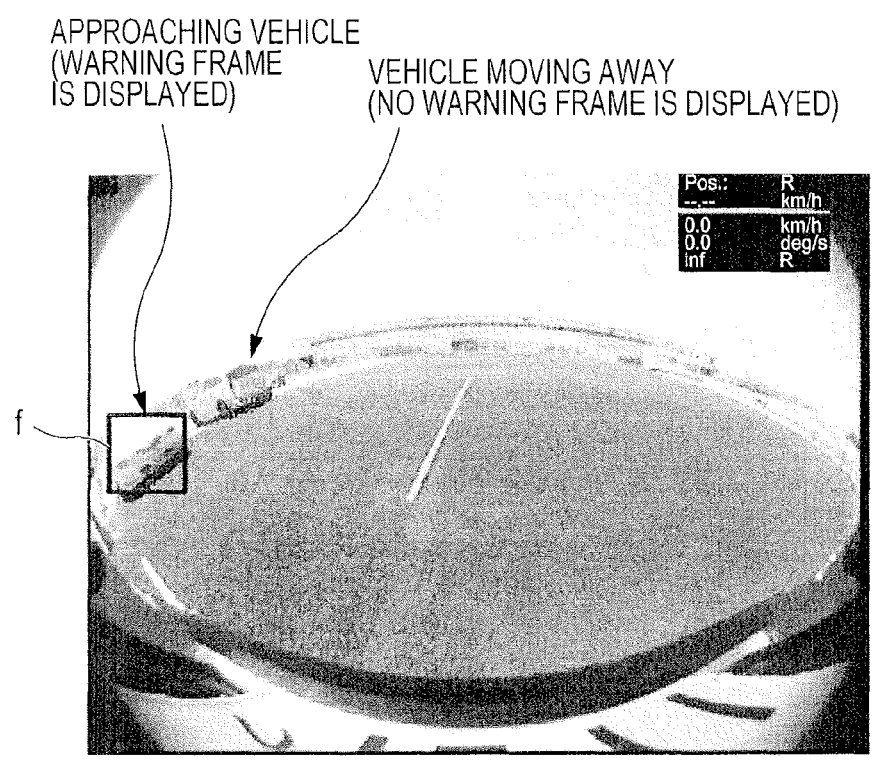
FIG. 13 illustrates one example of a state in which a warning is output in the first embodiment of the 3D-object detecting apparatus.

The warning output unit 12 may output the warning by displaying a warning frame f on the approaching object (the other vehicle) in a vehicle-surroundings monitor image (as illustrated in FIG. 13) created based on the captured image and displayed on a display unit 13 or by outputting a sound (e.g., a warning sound) via a sound output unit 14. The warning sound may be a speech sound stored in association with a movement vector and is announced through selection. One example of the speed sound is "Be aware of the approaching object at the rear right side." reporting the direction of the approaching object. The vehicle-surroundings monitor image may be an image resulting from distortion correction using internal parameters of the vehicle-mounted camera 2 or may be an image resulting from elimination of an unwanted image portion showing a diaphragm of the vehicle-mounted camera 2, a portion of the vehicle, or the like.

The above-described elements 3 to 12 of the 3D-object detecting apparatus 1 may be implemented by a CPU (central processing unit) for performing processing corresponding to the functions of the 3D-object detecting apparatus 1, a ROM (read only memory) in which a program executed by the CPU is stored, a RAM (random access memory) used for temporarily storing results of the processing of the CPU, and so on.

A first embodiment of a 3D-object detecting method according to the present embodiment, the above-described 3D-object detecting apparatus 1 being applied to the 3D-object detecting method, will now be described with reference to FIG. 14.

Figure 14:
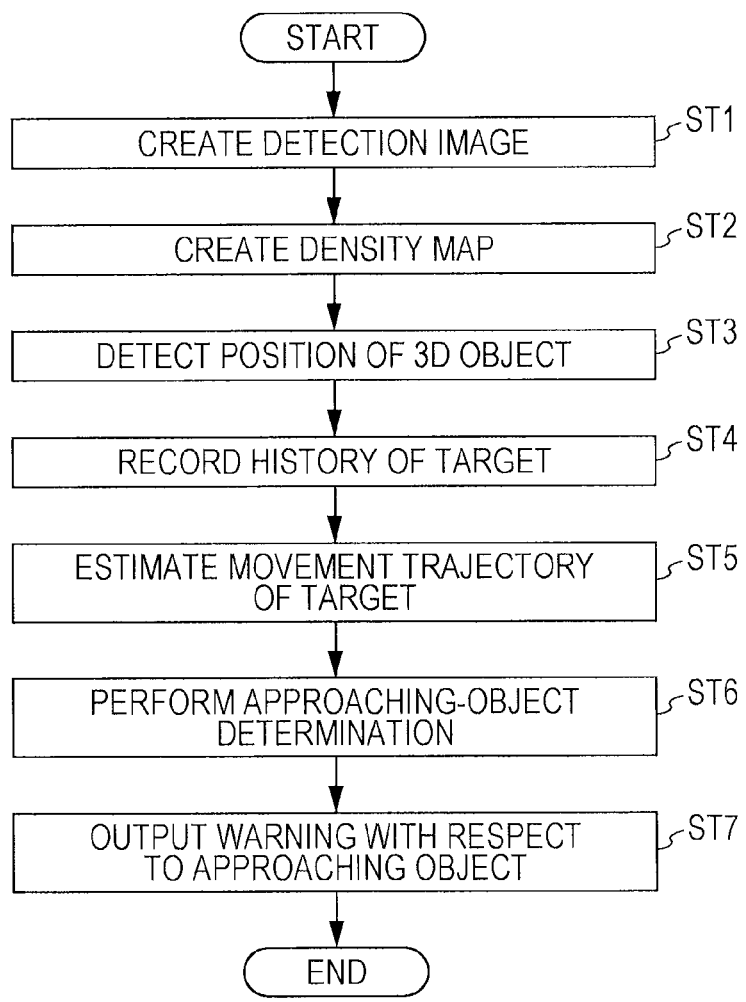
FIG. 14 is a flowchart illustrating a first embodiment of a 3D-object detecting method.

In the present embodiment, first, in step ST1 in FIG. 14, the detection-image creator 4 creates a detection image by using the above-described technique. Step ST1 is repeatedly performed for each period of creating a detection image.

In step ST2, the density-map creator 5 creates a density map by using the above-described technique. Step ST2 is repeatedly performed each time a latest detection image is created in step ST1.

In step ST3, the 3D-object position detector 6 detects the position of an object by using the above-described technique. Step ST3 is repeatedly performed each time a latest density map is created in step ST2.

In step ST4, the target-history recorder 7 records a history of a target by using the above-described technique. In step ST4, the history may be additionally recorded (or updated) or may be newly recorded, as described above.

In step ST5, the movement-trajectory estimator 10 estimates the movement trajectory of the target by using the above-described technique.

In step ST6, the approaching-object determiner 11 makes a determination (an approaching-object determination) as to whether or not the target is an approaching object, by using the above-described technique.

When it is determined in step ST6 that the target is an approaching object, the process proceeds to step ST7 in which the warning output unit 12 outputs a warning with respect to the approaching object.

As described above, the 3D-object position detection using the density map makes it possible to ensure a high detection-position accuracy. In addition, since complex processing, such as pattern matching, and a special position detecting device, such as a radar, are not required, the 3D-object position detection can be performed with a simple configuration and at lost cost. In addition, since a 3D object (a target) is tracked through monitoring of changes with time in the high-accuracy detection position based on the density map, whether or not the 3D object is an approaching object can be determined with high accuracy. Moreover, whether a newly detected 3D-object position is to be associated with a 3D object being already tracked or is to be regarded as an initial position of a new object to be tracked can be appropriately selected based on a distance relationship with the estimated current position of the 3D object being already tracked. Thus, whether or not the 3D object is an approaching object can be determined with higher accuracy.

When multiple 3D objects being already tracked are present in the vicinity of the position of a newly detected 3D object, the position of the newly detected 3D object can also be associated with a most identical one of the multiple 3D objects being tracked, on the basis of the distance relationship with the estimated current positions of the multiple 3D objects being tracked. Thus, whether or not the 3D object is an approaching object can be determined with higher accuracy. In addition, even when the vehicle-mounted camera 2 moves in conjunction with the vehicle, the past tracking result can be corrected according to the movement. Thus, the presence/absence of an approaching object can be stably determined through the appropriate 3D-object tracking. Furthermore, outputting of the warning with respect to the 3D object can be controlled based on a high-accuracy detection result indicating the position of the 3D object and an accurate determination result indicating whether or not the 3D object is an approaching object. Thus, it is possible to improve the reliability of the warning system.

Second Embodiment

A second embodiment of the 3D-object detecting apparatus will be described below with reference to FIGS. 15 and 16. In the description below, elements whose basic configurations are substantially the same as or similar to those in the first embodiment are denoted by the same reference numerals.

Figure 15:
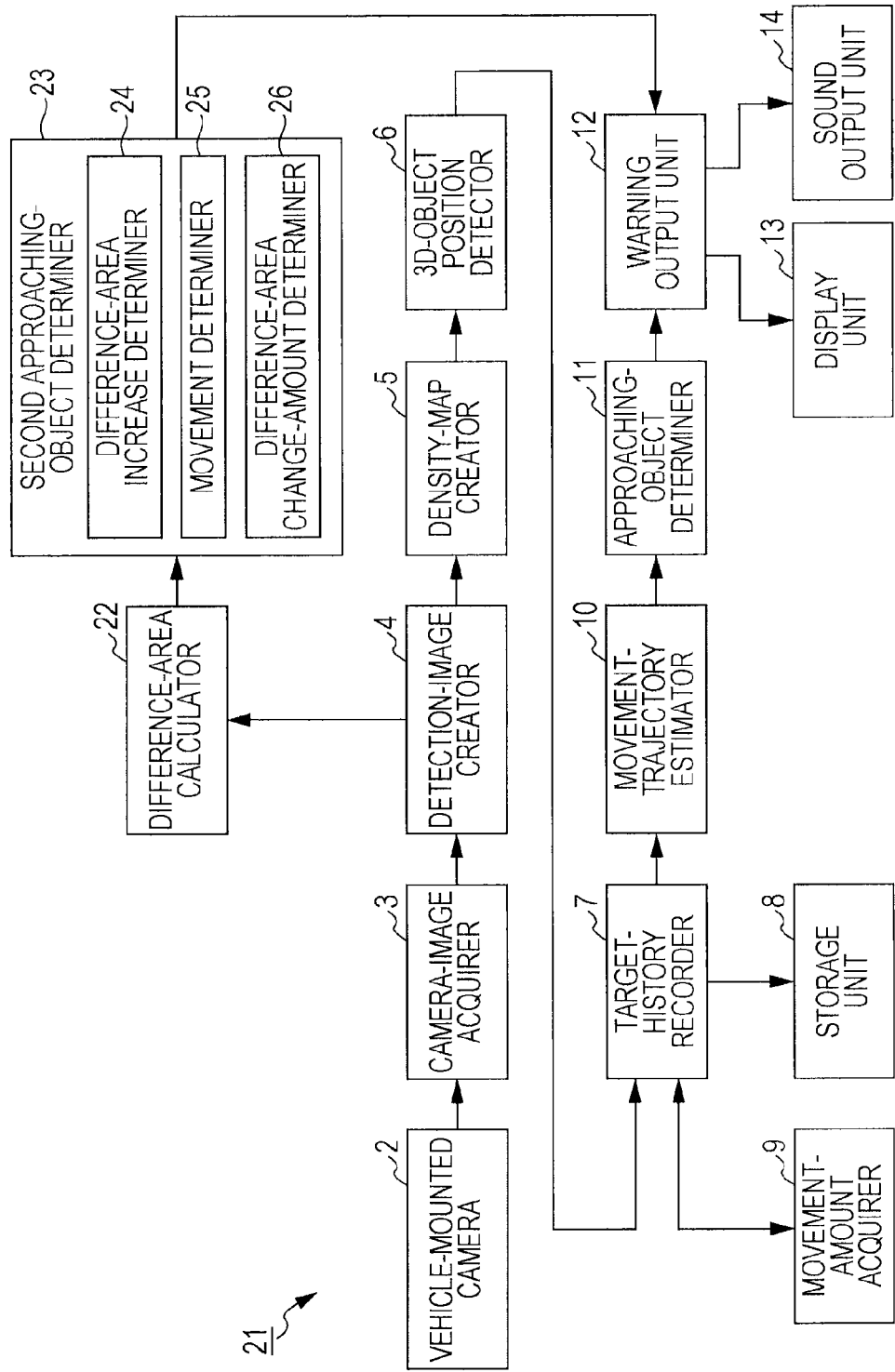
FIG. 15 is a block diagram illustrating a second embodiment of the 3D-object detecting apparatus.
Figure 16:
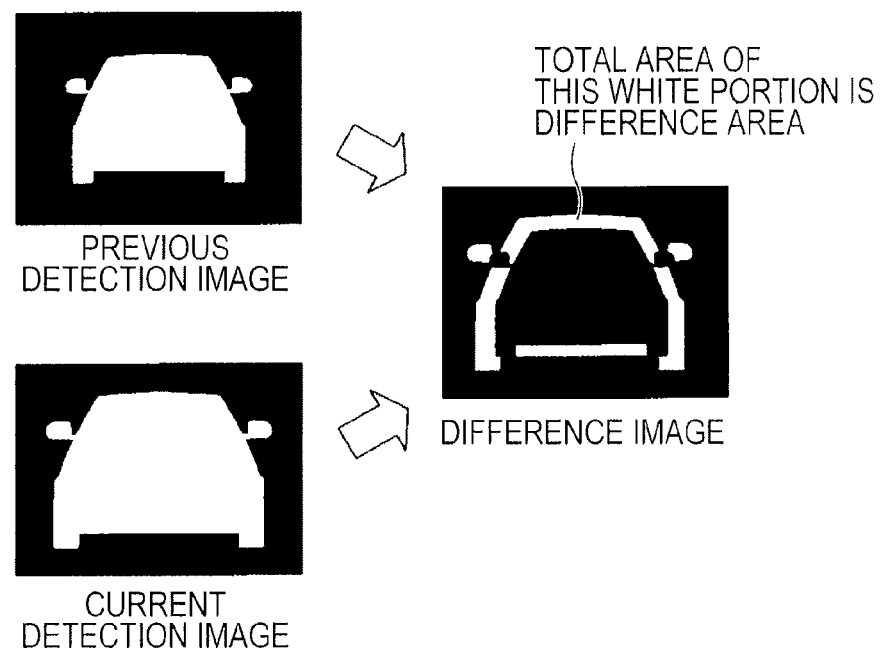
FIG. 16 schematically illustrates one implementation of a difference-area calculating method in the second embodiment of the 3D-object detecting apparatus.

FIG. 15 is a block diagram illustrating a 3D-object detecting apparatus 21 according to a second embodiment of the 3D-object detecting apparatus of the present invention. The 3D-object detecting apparatus 21 is mounted on a vehicle, as in the first embodiment.

As illustrated in FIG. 15, the 3D-object detecting apparatus 21 of the second embodiment has the same elements as those in the 3D-object detecting apparatus 1 of the first embodiment illustrated in FIG. 1. In addition to those elements in the first embodiment, as illustrated in FIG. 15, the 3D-object detecting apparatus 21 of the second embodiment further has a difference-area calculator 22, which serves as a difference-area calculating device. Each time the detection-image creator 4 creates a latest detection image, the difference-area calculator 22 is adapted to calculate a difference area between the latest detection image and a detection image created previous thereto. The difference area may also be calculated, for example, by determining a difference image representing a difference between the latest detection image and the previous detection image and determining the area of the difference image, as illustrated in FIG. 16. The difference image may also be determined as the number of pixels.

As illustrated in FIG. 15, the 3D-object detecting apparatus 21 further has a second approaching-object determiner 23, which serves as a second approaching-object determining device. On the basis of the difference area calculated by the difference-area calculator 22, the second approaching-object determiner 23 is adapted to determine whether or not a 3D object corresponding to the detection image is an approaching object.

More specifically, as illustrated in FIG. 15, the second approaching-object determiner 23 has a difference-area increase determiner 24, which serves as a difference-area increase determining device. The difference-area increase determiner 24 is adapted to determine whether or not the difference area has increased, on the basis of a change in the difference area calculated by the difference-area calculator 22 (i.e., the difference between a difference area calculated this time and a difference area previously calculated).

As illustrated in FIG. 15, the second approaching-object determiner 23 further has a movement determiner 25, which serves as a movement determining device. The movement determiner 25 is adapted to monitor the amount of movement of the vehicle to determine whether or not the vehicle is moving. The amount of movement of the vehicle may be obtained from the above-described movement-amount acquirer 9.

As illustrated in FIG. 15, the second approaching-object determiner 23 further has a difference-area change-amount determiner 26, which serves as a difference-area change-amount determining device. The difference-area change-amount determiner 26 is adapted to determine whether or not the amount of change in the difference area calculated by the difference-area calculator 22 is larger than or equal to a preset threshold amount of change.

With those elements 24 to 26, the second approaching-object determiner 23 is further adapted to determine that a 3D object corresponding to the detection image is an approaching object when one of conditions (a) and (b) described below is satisfied.

(a) The difference-area increase determiner 24 determines that the difference area has increased and the movement determiner 25 determines that the vehicle is not moving.

(b) The difference-area increase determiner 24 determines that the difference area has increased, the movement determiner 25 determines that the vehicle is moving, and the difference-area change-amount determiner 26 determines that the amount of change in the difference area is smaller the threshold amount of change.

On the other hand, when neither of the conditions (a) and (b) is satisfied, the second approaching-object determiner 23 is adapted to determine that the 3D object corresponding to the detection image is not an approaching object.

In the present embodiment, with respect to the 3D object determined by the second approaching-object determiner 23 not to be an approaching object, the warning output unit 12 is adapted so as not to output a warning even when the time-to-collision for the 3D object is less than or equal to a threshold time.

However, when the warning output unit 12 already outputs a warning with respect to the 3D object determined by the difference-area change-amount determiner 26 to have a difference area whose amount of change is larger than or equal to the threshold amount of change and thus determined by the second approaching-object determiner 23 not to be an approaching object, the warning output unit 12 is adapted to continuously output the warning.

Hitherto, as such a method for determining the presence/absence of an object approaching a vehicle, a technology for making a determination based on a change in a difference area has already been available. However, for making such a difference-area-based determination, a difference-area change due to movement of the vehicle may cause an erroneous determination indicating that it is due to an approaching object, and such an erroneous determination has been pointed out as a problem. In particular, when the vehicle moves under a situation in which an image of a stationary object (e.g., a stopped vehicle) that is present near the vehicle is captured by the vehicle-mounted camera 2, the difference area exhibits a significant increase. Consequently, the possibility of occurrence of an erroneous determination indicating that the increase in the difference area is due to an approaching object is considerably high. Such an erroneous determination leads to outputting of an unnecessary warning with respect to the nearby stationary object, thus causing the user's discomfort. The present embodiment is advantageous in order to avoid such problems.

Figure 17:
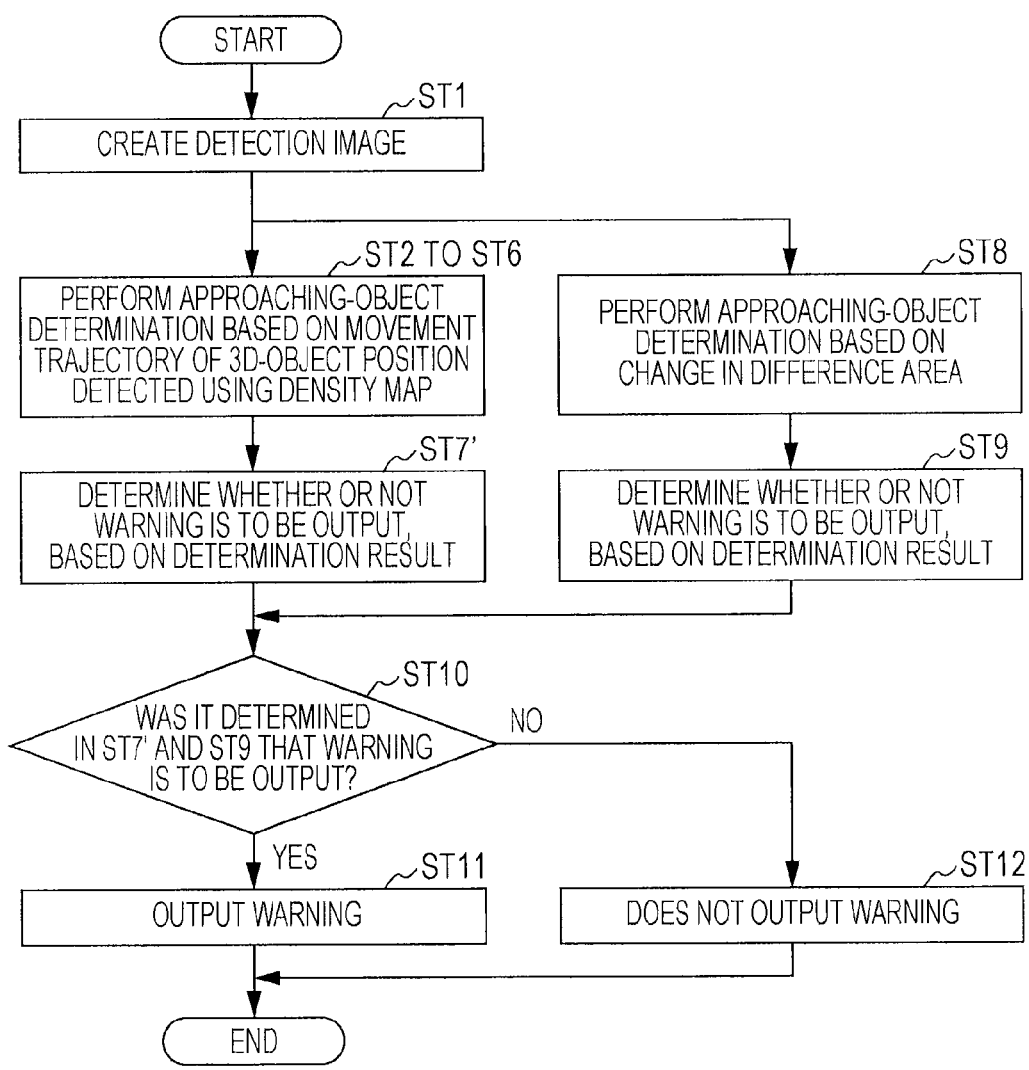
FIG. 17 is a first flowchart illustrating a second embodiment of the 3D-object detecting method.

A second embodiment of the 3D object detecting method using the 3D-object detecting apparatus 21 will be described below with reference to FIGS. 17 and 18.

In the present embodiment, first, in step ST1, the detection-image creator 4 creates a detection image, as in the first embodiment.

Next, in steps ST2 to ST6, which are similar to those in the first embodiment, the approaching-object determiner 11 makes a determination (an approaching-object determination) as to whether or not a target is an approaching object, on the basis of a movement trajectory (a movement vector) of a 3D-object position (a target) detected using a density map.

In step ST8, the second approaching-object determiner 23 makes an approaching-object determination on the basis of a change in a difference area.

In step ST7', on the basis of a result of the determination in steps ST2 to ST6, the warning output unit 12 determines whether or not a warning is to be output.

In step ST9, on the basis of a result of the determination in steps ST8, the warning output unit 12 determines whether or not a warning is to be output.

In step ST10, the warning output unit 12 determines whether or not it was determined in both of steps ST7' and ST9 that a warning is to be output. When an affirmative determination result is obtained in step ST10, the process proceeds to step ST11, and when a negative determination result is obtained in step ST10, the process proceeds to step ST12.

When the process proceeds to step ST11, the warning output unit 12 outputs a warning with respect to the 3D object corresponding to the detection image.

On the other hand, when the process proceeds to step ST12, the warning output unit 12 does not output a warning.

Figure 18:
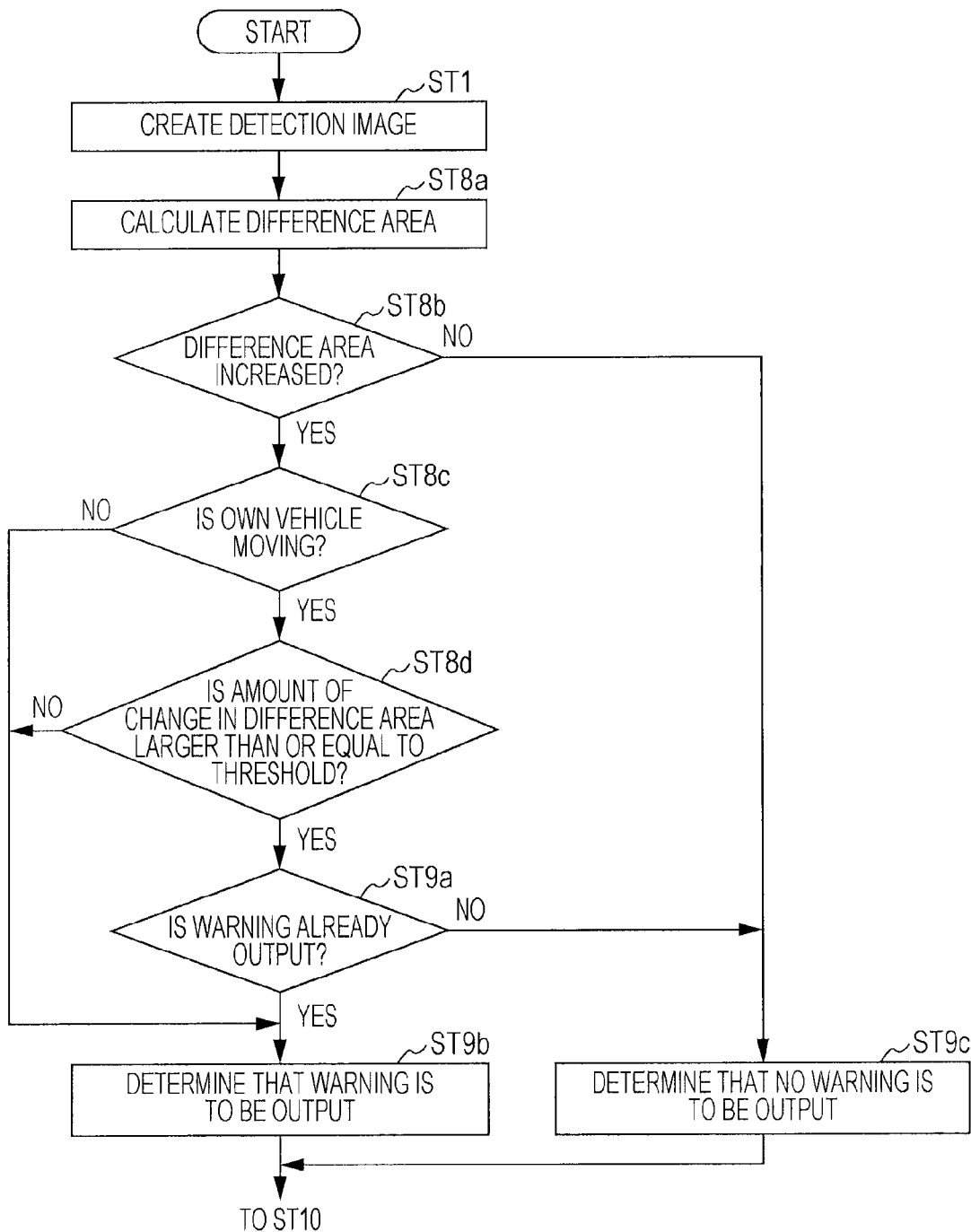
FIG. 18 is a second flowchart illustrating the second embodiment of the 3D-object detecting method.

FIG. 18 illustrates details of steps ST8 and ST9. As illustrated in FIG. 18, step ST8 is constituted by four steps, i.e., steps ST8a to ST8d. Step ST9 is constituted by three steps, i.e., steps ST9a to ST9c.

Specifically, first, in step ST8a, the difference-area calculator 22 calculates a difference area by using the above-described technique. Step ST8a is repeatedly performed each time the detection-image creator 4 creates a latest detection image.

In step ST8b, the difference-area increase determiner 24 determines whether or not the current difference area calculated in step ST8a has increased relative to a previously-calculated difference area. When an affirmative determination result is obtained in step ST8b, the process proceeds to step ST8c, and when a negative determination result is obtained in step ST8b, it is determined that the 3D object is not an approaching object and the process proceeds to step ST9c.

Processing in step ST8c and the subsequent steps will be described next. First, in step ST8c, the movement determiner 25 determines whether or not the vehicle is moving. When a negative determination result is obtained in step ST8c, it is determined that the 3D object is an approaching object and the process proceeds to step ST9b, and when an affirmative determination result is obtained in step ST8c, the process proceeds to step ST8d.

When the process proceeds to step ST9b, the warning output unit 12 determines that a warning is to be output. Thereafter, the process proceeds to step ST10.

On the other hand, when the process proceeds to ST8d, the difference-area change-amount determiner 26 determines whether or not the amount of change in the difference area is larger than or equal to the threshold amount of change. When an affirmative determination result is obtained in step ST8d, it is determined that the 3D object is not an approaching object and the process proceeds to step ST9a, and when a negative determination result is obtained in step ST8d, it is determined that the 3D object is an approaching object and the process proceeds to step ST9b.

In step ST9a, the warning output unit 12 determines whether or not a warning with respect to the 3D object corresponding to the detection image is already output. When an affirmative determination result is obtained in step ST9a, the process proceeds to step ST9b, and when a negative determination result is obtained in step ST9a, the process proceeds to step ST9c.

When the process proceeds to step ST9c, the warning output unit 12 determines that no warning is to be output. Thereafter, the process proceeds to step ST10.

In addition to the advantages of the first embodiment, the present embodiment can prevent a false warning with respect to a stationary object (particularly, a nearby stationary object) from being issued in conjunction with movement of the vehicle. The present embodiment provides an advantage in that the user's discomfort due to an unnecessary warning is reduced.

The present invention is not limited to the above-described embodiments, and various changes and modifications can also be made thereto without departing from the features of the present invention. It is therefore intended that the foregoing detailed description be regarded as illustrative rather than limiting, and that it be understood that it is the following claims, including all equivalents, that are intended to define the spirit and scope of this invention.

What is claimed is:

1. A three-dimensional-object detecting apparatus that has a single image-capture device provided at a predetermined position to capture an image of a predetermined image-capture region including a predetermined image-capture surface and that detects a three-dimensional object on the image-capture surface on a basis of the captured image of the image-capture region, the three-dimensional-object detecting apparatus comprising:

a detection-image creating device configured to detect the three-dimensional object on the image-capture surface on a basis of the captured image and to create a detection image in which a silhouette of only the detected three-dimensional object is left by eliminating an unnecessary region other than the detected three-dimensional object;

a density-map creating device configured to pre-store mask images, obtained by arranging virtual cuboids having a certain width, depth, and height at predetermined coordinate points in a coordinate plane set on the image-capture surface and projecting silhouettes of the arranged virtual cuboids onto an imaging plane of the image-capture device, for the corresponding coordinate points different from each other, to determine, as the three-dimensional-object's spatial densities at the corresponding coordinate points, area ratios with respect to respective portions where the three-dimensional-object silhouette in the detection image and the cuboid silhouettes in the mask images for the corresponding coordinate points overlap each other, and to arrange, in accordance with an arrangement sequence of the coordinate points, pixels for the respective coordinate points such that the pixels have pixel values corresponding to the determined spatial densities at the respective coordinate points, to thereby create a density map indicating distribution of the spatial densities on the image-capture surface; and a three-dimensional-object position detecting device configured to extract at least one high-density region in which the pixel value exceeds a threshold pixel value from the density map created by the density-map creating device and to detect, as the position of the three-dimensional object corresponding to the high-density region, coordinates of a representative point that is included in the extracted high-density region and that is closest to the image-capture device.

2. The three-dimensional-object detecting apparatus according to claim 1, wherein the detection-image creating device is configured to repeatedly create the detection image for each predetermined creation period;

the density-map creating device is configured to create a latest one of the density map, each time the detection image is created; and the three-dimensional-object position detecting device is configured to detect a latest position of the three-dimensional object, each time the latest density map is created;

wherein the three-dimensional-object detecting apparatus further comprises:

a target-history recording device configured to record, as a history of a target to be tracked, the latest position of the three-dimensional object to a storage unit in association with detection time of the latest three-dimensional-object position;

a movement-trajectory estimating device configured to estimate a movement trajectory of the target on a basis of the recorded target history; and an approaching-object determining device configured to determine whether or not the target corresponding to the movement trajectory is an approaching object, on a basis of the estimated movement trajectory.

3. The three-dimensional-object detecting apparatus according to claim 2, wherein, upon detecting the latest three-dimensional-object position, the target-history recording device is configured to estimate a current position of the target already recorded as the history on a basis of the history, to compare the estimated current target position with the detected latest three-dimensional-object position, wherein when the estimated current target position and the detected latest three-dimensional-object position are regarded as being close to each other, the target-history recording device is additionally configured to record the detected latest three-dimensional-object position to the history of the target corresponding to the estimated current target position in association with the detection time of the latest three-dimensional-object position, and when the estimated current target position and the detected latest three-dimensional-object position are regarded as being far from each other, the target-history recording device is configured to newly record the detected latest three-dimensional-object position to the storage unit as a history of a new target in association with the detection time of the latest three-dimensional-object position.

4. The three-dimensional-object detecting apparatus according to claim 3, wherein, when multiple targets whose estimated current target positions are regarded as being close to the detected latest three-dimensional-object position are present, the target-history recording device is configured to additionally record the detected latest three-dimensional-object position to, of the histories of the multiple objects, the history of the target whose estimated current target position is closest to the detected latest three-dimensional-object position.

5. The three-dimensional-object detecting apparatus according to claim 2, wherein the image-capture device is provided on a movable body, and the three-dimensional-object detecting apparatus further comprises a movement-amount obtaining device configured to obtain an amount of movement of the movable body, and wherein, on a basis of the obtained amount of movement of the movable body, the target-history recording device is configured to correct the three-dimensional-object position in the history of the target.

6. The three-dimensional-object detecting apparatus according to claim 2, further comprising a warning output device configured to determine, on a basis of the estimated movement trajectory of the target, a time-to-collision of the target determined by the approaching-object determining device to be an approaching object, wherein, when the determined time-to-collision is less than or equal to a threshold time, the warning output device is configured to output a warning with respect to the target.

7. The three-dimensional-object detecting apparatus according to claim 6, wherein the image-capture device is provided on a movable body, and the three-dimensional-object detecting apparatus further comprises:

a difference-area calculating device configured to calculate, each time the latest detection image is created, a difference area between the latest detection image and the detection image created previous thereto; and a second approaching-object determining device configured to determine whether or not the three-dimensional object corresponding to the detection image is an approaching object, on a basis of the difference area calculated by the difference-area calculating device;

wherein the second approaching-object determining device comprises a difference-area increase determining device configured to determine whether or not the difference area has increased, on a basis of a change in the calculated difference area, a movement determining device configured to determine whether or not the movable body is moving, and a difference-area change-amount determining device configured to determine whether or not the amount of change in the calculated difference area is larger than or equal to a threshold amount of change;

wherein, when one of a condition (a) that it is determined that the difference area has increased and the movable body is not moving and a condition (b) that it is determined that the difference area has increased, the movable body is moving, and the amount of change in the difference area is smaller than the threshold amount of change is satisfied, the second approaching-object determining device is configured to determine that the three-dimensional object is an approaching object, and when neither of the conditions (a) and (b) is satisfied, the second approaching-object determining device is configured to determine that the three-dimensional object is not an approaching object; and wherein, with respect to the three-dimensional object determined by the second approaching-object determining device not to be an approaching object, the warning output device does not output the warning even when the time-to-collision for the three-dimensional object is less than or equal to the threshold time.

8. The three-dimensional-object detecting apparatus according to claim 7, wherein when the warning output device already outputs the warning with respect to the three-dimensional object determined to have a difference area whose amount of change is larger than or equal to the threshold amount of change and thus determined by the second approaching-object determining device not to be an approaching object, the warning output device is configured to continuously output the warning.

9. A three-dimensional-object detecting method in which a single image-capture device for capturing an image of a predetermined image-capture region including a predetermined image-capture surface is provided at a predetermined position and a three-dimensional object on the image-capture surface is detected based on the captured image of the image-capture region, the three-dimensional-object detecting method comprising:

a step 1 of detecting the three-dimensional object on the image-capture surface on a basis of the captured image and of creating a detection image in which a silhouette of only the detected three-dimensional object is left by eliminating an unnecessary region other than the detected three-dimensional object from the captured image;

a step 2 of preparing mask images, obtained by arranging virtual cuboids having a certain width, depth, and height at predetermined coordinate points in a coordinate plane set on the image-capture surface and projecting silhouettes of the arranged virtual cuboids onto an imaging plane of the image-capture device, for the corresponding coordinate points different from each other, of determining, as the three-dimensional-object's spatial densities at the corresponding coordinate points, area ratios with respect to respective portions where the three-dimensional-object silhouette in the detection image created in the step 1 and the cuboid silhouettes in the mask images for the corresponding coordinate points overlap each other, and of arranging, in accordance with an arrangement sequence of the coordinate points, pixels for the respective coordinate points such that the pixels have pixel values corresponding to the determined spatial densities at the respective coordinate points, to thereby create a density map indicating distribution of the spatial densities on the image-capture surface; and a step 3 of extracting at least one high-density region in which the pixel value exceeds a threshold pixel value from the density map created in the step 2 and detecting, as the position of the three-dimensional object corresponding to the high-density region, coordinates of a representative point that is included in the extracted high-density region and that is closest to the image-capture device.

10. The three-dimensional-object detecting method according to claim 9, wherein
in the step 1, the detection image is repeatedly created for each predetermined creation period;
in the step 2, a latest one of the density map is created each time a latest one of the detection image is created in the step 1; and
in the step 3, a latest position of the three-dimensional object is detected each time the latest density map is created in the step 2;
wherein the three-dimensional-object detecting method further comprises:
  a step 4 of recording, as a history of a target to be tracked, the latest three-dimensional-object position detected in the step 3 to a storage unit in association with detection time of the latest three-dimensional-object position;
  a step 5 of estimating a movement trajectory of the target on a basis of the target history recorded in the step 4; and
  a step 6 of determining whether or not the target corresponding to the movement trajectory is an approaching object, on a basis of the movement trajectory estimated in the step 5.

11. The three-dimensional-object detecting method according to claim 10, wherein the step 4 comprises:
a step 4a of determining, when the latest three-dimensional-object position is detected in the step 3, a current position of the target already recorded in the history on a basis of the history and of comparing the estimated current target position with the detected latest three-dimensional-object position, and
a step 4b of additionally recording the detected latest three-dimensional-object position to the history of the target corresponding to the estimated current target position in association with the detection time of the latest three-dimensional-object position, when the estimated current target position and the detected latest three-dimensional-object position are regarded as being close to each other, and of newly recording the detected latest three-dimensional-object position to the storage unit as a history of a new target in association with the detection time of the latest three-dimensional-object position, when the estimated current target position and the detected latest three-dimensional-object position are regarded as being far from each other.

12. The three-dimensional-object detecting method according to claim 11, wherein, in the step 4b, when multiple targets whose estimated current target positions are regarded as being close to the detected latest three-dimensional-object position are present, the detected latest three-dimensional-object position is additionally recorded to, of the histories of the multiple objects, the history of the target whose estimated current target position is closest to the detected latest three-dimensional-object position.

13. The three-dimensional-object detecting method according to claim 10, wherein the image-capture device is provided on a movable body, and the three-dimensional-object detecting method further comprises:
  a step 7 of obtaining an amount of movement of the movable body, and
  a step 8 of correcting the three-dimensional-object position in the history of the target on a basis of the amount of moveable-body movement obtained in the step 7.

14. The three-dimensional-object detecting method according to claim 10, further comprising a step 9 of determining, on a basis of the estimated movement trajectory of the target, a time-to-collision of the target determined in the step 6 to be an approaching object, and of outputting a warning with respect to the target when the determined time-to-collision is less than or equal to a threshold time.

15. The three-dimensional-object detecting method according to claim 14, wherein the image-capture device is provided on a movable body, and the three-dimensional-object detecting method further comprises:
  a step 10 of calculating, each time the latest detection image is created in the step 1, a difference area between the latest detection image and the detection image created previous thereto; and
  a step 11 of determining whether or not the three-dimensional object corresponding to the detection image is an approaching object, on a basis of the difference area calculated in the step 10;
  wherein, in the step 11, when one of a condition (a) that it is determined based on a change in the determined difference area that the difference area has increased and it is determined that the movable body is not moving and a condition (b) that it is determined based on a change in the determined difference area that the difference area has increased, it is determined that the movable body is moving, and it is determined the amount of change in the determined difference area is smaller than the threshold amount of change is satisfied, it is determined that the three-dimensional object is an approaching object, and when neither of the conditions (a) and (b) is satisfied, it is determined that the three-dimensional object is not an approaching object; and
  Wherein, in the step 9, with respect to the three-dimensional object determined in the step 11 not to be an approaching object, the warning is not output even when the time-to-collision for the three-dimensional object is less than or equal to the threshold time.

16. The three-dimensional-object detecting method according to claim 15, wherein, in the step 9, when the warning is already output with respect to the three-dimensional object determined to have a difference area whose amount of change is larger than or equal to the threshold amount of change and thus determined in the step 11 not to be an approaching object, the warning is continuously output.

* * * * *